(12) United States Patent
Sadana

(10) Patent No.: US 12,300,811 B2
(45) Date of Patent: May 13, 2025

(54) LITHIUM-ION BATTERY WITH THIN CRYSTALLINE ANODE AND METHODS OF MAKING SAME

(71) Applicants: POSI ENERGY-SILICON POWER, LLC, Pleasantville, NY (US); Devendra K. Sadana, Pleasantville, NY (US)

(72) Inventor: Devendra K. Sadana, Pleasantville, NY (US)

(73) Assignee: POSI ENERGY—SILICON POWER, LLC, Pleasantville, NY (US)

( * ) Notice: Subject to any disclaimer, the term of this patent is extended or adjusted under 35 U.S.C. 154(b) by 569 days.

(21) Appl. No.: 17/547,958

(22) Filed: Dec. 10, 2021

(65) Prior Publication Data
US 2022/0223848 A1 Jul. 14, 2022

Related U.S. Application Data

(63) Continuation-in-part of application No. 17/366,521, filed on Jul. 2, 2021.
(Continued)

(51) Int. Cl.
| | |
|---|---|
| *H01M 4/38* | (2006.01) |
| *H01M 4/02* | (2006.01) |
| *H01M 4/04* | (2006.01) |
| *H01M 4/134* | (2010.01) |
| *H01M 4/36* | (2006.01) |

(Continued)

(52) U.S. Cl.
CPC ......... *H01M 4/386* (2013.01); *H01M 4/0426* (2013.01); *H01M 4/134* (2013.01); *H01M 4/366* (2013.01); *H01M 4/382* (2013.01); *H01M 4/661* (2013.01); *H01M 10/0525* (2013.01); *H01M 2004/021* (2013.01); *H01M 2300/0091* (2013.01)

(58) Field of Classification Search
CPC .... H01M 4/386; H01M 4/0426; H01M 4/661; H01M 4/134; H01M 4/366; H01M 4/382
See application file for complete search history.

(56) References Cited

U.S. PATENT DOCUMENTS

| | | |
|---|---|---|
| 6,900,114 B2 | 5/2005 | Ohmi et al. |
| 7,368,332 B2 | 5/2008 | Moriwaki et al. |

(Continued)

FOREIGN PATENT DOCUMENTS

| | | |
|---|---|---|
| WO | WO2011156419 A2 | 12/2011 |
| WO | WO2017093074 A1 | 6/2017 |

(Continued)

*Primary Examiner* — Sarah A. Slifka
(74) *Attorney, Agent, or Firm* — Thomas A. Beck

(57) ABSTRACT

Methods for minimizing or eliminating cracks in the crystalline porous-Si structure that can occur during the layer release process and/or during subsequent processing in a lithium-ion battery during charge and discharge cycles. The methods include: modifying the anodic etching process so that a freestanding film of Si with the anode structure is detached from a p-doped substrate; depositing a conductive layer on the back surface of the released porous-Si structure with or without a metallic seed layer; mechanically or chemically thinning the back surface of the Si substrate after forming the porous-Si at the front surface of a thick Si substrate; forming a thin crystalline porous-Si anode structure on a p-doped silicon epitaxy grown on porous-Si with a porous-Si release layer.

18 Claims, 18 Drawing Sheets

Related U.S. Application Data

(60) Provisional application No. 63/136,189, filed on Jan. 11, 2021.

(51) Int. Cl.
  *H01M 4/66* (2006.01)
  *H01M 10/0525* (2010.01)

(56) References Cited

U.S. PATENT DOCUMENTS

| | | |
|---|---|---|
| 8,889,295 B2 | 11/2014 | Yushin et al. |
| 10,581,109 B2 | 3/2020 | Souza et al. |
| 10,644,356 B2 | 5/2020 | Souza et al. |
| 10,777,842 B2 | 9/2020 | Souza et al. |
| 2017/0098823 A1 | 4/2017 | Yushin et al. |
| 2019/0115625 A1 | 4/2019 | Sadana et al. |
| 2019/0214082 A1 | 7/2019 | Li et al. |
| 2020/0014018 A1 | 1/2020 | de Souza et al. |
| 2020/0014058 A1 | 1/2020 | de Souza et al. |
| 2020/0014059 A1 | 1/2020 | de Souza et al. |
| 2020/0014060 A1 | 1/2020 | de Souza et al. |
| 2020/0020895 A1 | 1/2020 | Collins et al. |
| 2020/0335826 A1 | 10/2020 | Collins et al. |
| 2020/0403190 A1 | 12/2020 | Collins et al. |

FOREIGN PATENT DOCUMENTS

| | | |
|---|---|---|
| WO | WO2019077426 A1 | 4/2019 |
| WO | WO2020008285 A1 | 1/2020 |

LITHIUM-ION BATTERY WITH THIN CRYSTALLINE ANODE AND METHODS OF MAKING SAME

This application is a continuation-in-part application of non-provisional application Ser. No. 17/366,521 filed Jul. 2, 2021, which was based on provisional application Ser. No. 63/136,189, filed Jan. 11, 2021.

FIELD OF THE INVENTION

The present invention relates to lithium-ion batteries having improved structures and methods of making said lithium ion battery structures.

BACKGROUND OF THE INVENTION

Lithium batteries can charge and discharge many times, are generally stable, and have high energy densities per weight and volume.

In some embodiments, anodes in lithium-ion batteries are made from silicon, specifically a silicon powder that has small crystalline silicon particles in random orientations packed together with graphite powder. There are voids/spaces among these particles. Lithium is stored within the silicon and graphite particles (which have a high absorption for the lithium) and in the voids/spaces.

In some embodiments, the prior art uses thick silicon substrates that are porous. The silicon substrates have long deep pores with large average pore diameters to increase the surface area (e.g., the surface area of the pore walls) of the silicon exposed to lithium within the silicon substrate. In some embodiments, the pores in the silicon substrates have large spaces between them so that there is space for the lithiated silicon substrate to expand and contract during charge and discharge cycling.

These types of porous silicon substrate can form long nanowire-type lithiated silicon structures within the silicon substrate. Accordingly, while increasing lithium storage per silicon substrate volumes (due to the increased porous surface area exposed to lithium), these silicon substrates increase the amount of lithium intercalation and structural failures of these substrates.

To store large amounts of lithium and improve the energy density of these batteries (e.g., both in micro-batteries and larger batteries, like power cells), the cathode region has to be thick, i.e., greater than 100 microns in thickness. The large thickness of these cathodes provides a larger amount of lithium for storage in the battery anode.

During a discharge cycle, when the battery is connected to an external circuit load, electrons flow from the anode through the circuit load and back to the cathode. Generally, the lithium metal atoms diffused in and/or in contact with the anode, lose an electron and become lithium ions in, on, or near the anode and silicon substrate. These lithium ions then move through the battery, e.g., through the battery electrolyte, creating an (lithium ion) ionic current. Reaching the cathode, lithium ions intercalate into the cathode lattice and are reduced by electrons provided from the load circuit.

During a charging cycle, the ionic current reverses in the battery. A charging power source removes electrons from the lithium compounds at the cathode to create lithium ions at/in the cathode region. In the charging cycle, these lithium ions migrate through the electrolyte as lithium ionic current back to the anode and accumulate at anode surface or intercalate in the anode lattice where they become reduced by the electrons provided by the charging power source. The accumulation of lithium metal at the anode and electrochemical processes within the battery causes a potential difference across the battery between the anode and cathode that enables the battery to produce a current through an external load during the next discharge cycle.

Lithium is absorbed or intercalated at a high concentration in these prior art anode substrates, e.g., silicon substrates. This intercalation (reversible inclusion or insertion of a molecule or ion into a material layer) creates large volume changes in the substrate during the charge and discharge cycles. These volume changes cause battery failure due to silicon substrate cracking, battery leakage of internal components, contaminants entering the battery, internal shorting of battery components, etc.

Other failure modes include lithium dendrite growth into and from the substrate which also causes component shorting, substrate weakening, cracking, contamination, battery leakage, etc.

As stated, thick silicon (Si) substrates used in lithium ion batteries have many failure modes due to lithium intercalation, substrate volume cycling, and dendrite growth. In addition, these thicker substrates are inflexible or have reduced flexibility because of their thickness which prevents forming the lithium batteries into shapes useful for many physical structures.

Thicker substrates used in the prior art anodes also are costly in terms of battery energy density as measured by energy per battery volume and/or energy per battery weight. There is a need to: reduce the failure rate of lithium batteries and lithium battery anodes, increase energy density per battery weight and volume, increase battery charge rate, and enable flexible lithium batteries that can easily form into multiple physical configurations.

There is also a need for methods of making these batteries easily and cheaply. These improvements are needed for energy storage in general and specifically for uses in microelectronics, cell phones, the internet of things (IoT), home and large building energy storage/capacity, vehicles (including electric cars, boats, trucks, trains, and other forms of transport), and energy storage/capacity in high power applications in industry. Electric utility applications need these improved batteries for storing large amounts of energy generated by alternative energy sources like wind, tides, solar, etc. to help make these alternative energy sources be viable and reliable, and to provide a continuous energy supply when the charging from an intermittent energy source.

BRIEF SUMMARY OF THE INVENTION

Embodiments of this invention include improvements to various configurations of lithium batteries that have a cathode made of a lithium containing material, an anode, and an electrolyte/separator between the cathode and anode, wherein the anode includes a conductive anode current collector made of a material non-reactive with lithium, and a nucleation layer on the anode current collector surface that can create a lithium metal layer that is continuous on the conductive substrate surface. The present invention also includes methods for making the improved lithium batteries.

In some embodiments the lithium ion battery has a free standing crystalline porous-Si anode structure.

In some embodiments the lithium ion battery has metal coating on the back surface of same.

In some embodiments, the lithium ion battery has a thin porous-Si anode structure assisted by a non-Li reacting metal layer that is physically deposited by vacuum evaporation or by sputtering, or deposited by electroless, or by electroplating electroless or electroplated.

In some embodiments the lithium ion battery has a thin crystalline porous-Si anode structure on p-doped Silicon epitaxy grown on porous-Si with a porous-Si release layer. Surface cracks in a Si-anode can occur when during the layer release process.

Alternative embodiments of making the improved lithium-ion battery include mechanically thinning of the crystalline porous-Si anode structure. In these schemes the crack formation is eliminated because the starting Si has already been thinned to a desired thickness by the aforementioned processes and there is no need to perform the layer release process which is the source of crack formation.

In yet other embodiments the present invention addresses the problem of the formation of surface cracks in the crystalline porous Si-anode that can occur during a layer release process by modifying an anode etching process to form a free standing crystalline porous-Si structure; applying a metal coating on the back surface of a crystalline porous-Si anode structure; mechanically or chemically thinning the crystalline Si substrate under the porous-Si structure, if required; and forming a thin crystalline porous-Si structure on p-doped Silicon epitaxy grown on porous-Si with a porous-Si release layer.

BRIEF DESCRIPTION OF THE DRAWINGS

Various embodiments of the present invention will be described below in more detail, with reference to the accompanying drawings, now briefly described. The Figures show various apparatus, structures, devices, and related method embodiments of the present invention and invention uses.

FIG. 6 is a block diagram of one interim semiconductor layer structure used to form anode structures.

FIG. 7 is a flow chart of embodiments of a process of making thin anode structures and reuse of the Si substrate.

FIG. 13$b$ is a block diagram cross-sectional view of metal filled cracks in the released crystalline porous-Si anode structure on a thermal or UV released tape.

FIG. 13$c$ is a block diagram cross-sectional view of metal filled cracks in the released crystalline porous-Si anode structure on a thermal or UV released tape after electroless or electroplating of a non-Li reacting metal.

THE PREFERRED EMBODIMENTS

Figure 1:
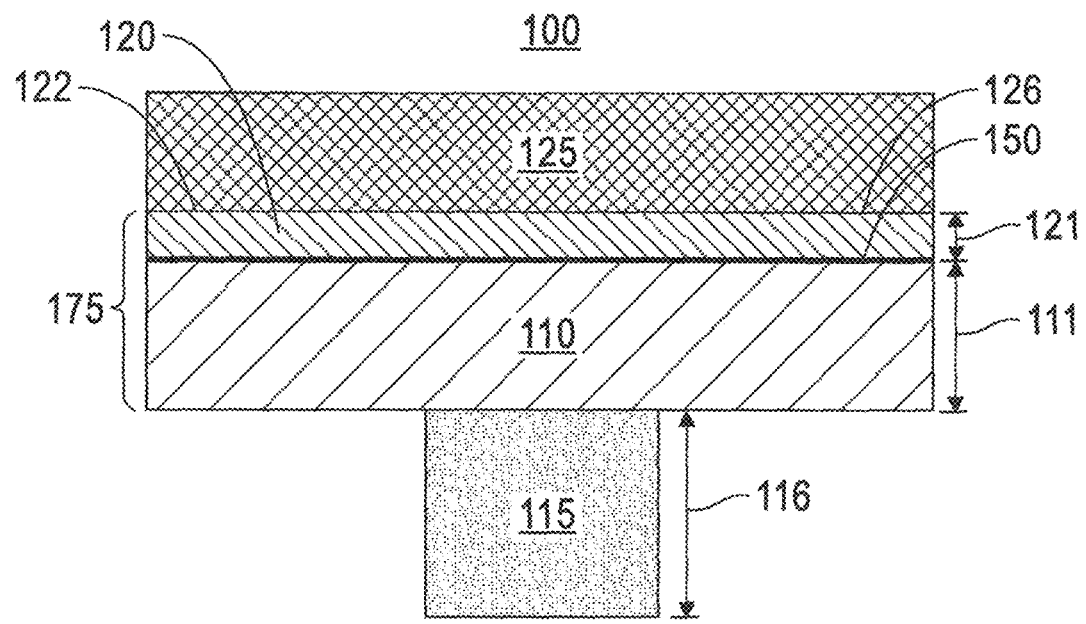
FIG. 1 is a block diagram of a cross section elevation of an anode used in a battery, e.g., an energy storage device, where the anode is made of a thin conductive current collector where different embodiments of the conductive current collector surface are used to facilitate forming a lithium nucleation layer.

It is to be understood that embodiments of the present invention are not limited to the illustrative methods, apparatus, structures, systems and devices disclosed herein but instead are more broadly applicable to other alternative and broader methods, apparatus, structures, systems and devices that become evident to those skilled in the art given this disclosure.

In addition, it is to be understood that the various layers, structures, and/or regions shown in the accompanying drawings are not drawn to scale, and that one or more layers, structures, and/or regions of a type commonly used may not be explicitly shown in a given drawing. This does not imply that the layers, structures, and/or regions not explicitly shown are omitted from the actual devices.

In addition, certain elements may be left out of a view for the sake of clarity and/or simplicity when explanations are not necessarily focused on such omitted elements. Moreover, the same or similar reference numbers used throughout the drawings are used to denote the same or similar features, elements, or structures, and thus, a detailed explanation of the same or similar features, elements, or structures will not be repeated for each of the drawings.

The devices, structures, and methods disclosed in accordance with embodiments of the present invention can be employed in applications in the semiconductor and electronics applications like hardware and/or electronic systems including but are not limited to, personal computers, communication networks, electronic commerce systems, portable communications devices (e.g., cell and smart phones), internet-of-things (IoT), solid-state media storage devices, expert and artificial intelligence systems, functional circuitry, neural networks, etc.

However, uses are also found in other high energy density larger energy storage systems including battery powered vehicles (e.g., cars, trucks, boats, trains, etc.); energy storage for housing, office buildings, and other structures; and industrial power storage including storage of intermittent power generation (e.g., wind and solar power generation); etc.

As used herein, "height" refers to a vertical size of an element (e.g., a layer, trench, hole, opening, etc.) in the cross-sectional or elevation views measured from a bottom surface to a top surface of the element, and/or measured with respect to a surface on which the element is located.

Conversely, a "depth" refers to a vertical size of an element (e.g., a layer, trench, hole, opening, etc.) in the cross-sectional or elevation views measured from a top surface to a surface of the element. Terms such as "thick", "thickness", "thin" or derivatives thereof may be used in place of "height" where indicated.

As used herein, "lateral," "lateral side," "side," and "lateral surface" refer to a side surface of an element (e.g., a layer, opening, etc.), such as a left or right-side surface in the drawings.

As used herein, "width" or "length" refers to a size of an element (e.g., a layer, trench, hole, opening, etc.) in the drawings measured from a side surface to an opposite surface of the element. Terms such as "thick", "thickness", "thin" or derivatives thereof may be used in place of "width" or "length" where indicated.

As used herein, terms such as "upper", "lower", "right", "left", "vertical", "horizontal", "top", "bottom", and derivatives thereof shall relate to the disclosed structures and methods, as oriented in the drawing figures. For example, as used herein, "vertical" refers to a direction perpendicular to the top surface of the substrate in the elevation views, and "horizontal" refers to a direction parallel to the top surface of the substrate in the elevation views.

As used herein, unless otherwise specified, terms such as "on", "overlying", "atop", "on top", "disposed on", "positioned on" or "positioned atop" mean that a first element is present on a second element, wherein intervening elements may be present between the first element and the second element.

As used herein, unless otherwise specified, the term "directly" used in connection with the terms "on", "overlying", "atop", "on top", "positioned on" or "positioned atop," "disposed on," or the terms "in contact" or "direct contact" means that a first element and a second element are connected without any intervening elements, such as, for example, intermediary conducting, insulating or semiconductor layers or formed electrochemical layers, present between the first element and the second element. It is understood that these terms might be affected by the orientation of the device described. For example, while the meaning of these descriptions might change if the device was rotated upside down, the descriptions remain valid because they describe relative relationships between features of the invention.

Embodiments of this invention include various cathode structures in various lithium battery embodiments also having various anode structures where the anode structure is thin, e.g., the total thickness of all three layers is less than 100 micrometers/microns (urn) or less than 25 microns thick.

Embodiments enable plating and stripping of a lithium metal layer on an anode surface, e.g., a smooth anode surface and/or an anode nucleation surface (nucleation surface). The nucleation surface can be the surface of a conductive current collector modified to enable a lithium seed layer and formation of a lithium metal layer. In alternative embodiments, the nucleation can be one or more thin semiconductor, e.g., silicon, layers, including but not limited to a single crystal porous Si surface, disposed on a conductive current collector. The anode nucleation layer enables a lithium metal layer to easily vary (grow and shrink) in thickness during battery charge and discharge cycles with no or a minimum of lithium intercalation.

In some embodiments, the anode nucleation layer facilitates a lithium seed layer formation that in turn facilitates formation of a lithium metal layer or lithium layer.

The effective formation of the lithium metal layer prevents or greatly inhibits the lithium ions from penetrating through the lithium metal layer and therefore eliminates or greatly reduces lithium intercalation into other layer(s) below. As a result, battery component deterioration/failure resulting from volume cycling and other intercalation effects are eliminated or reduced.

In some embodiments, the smoothness of the nucleation layer surface inhibits or prevents dendrite growth on/in the anode and therefore prevents battery deterioration and/or the electrical shorting of internal battery components, e.g., shorting to the cathode and electrolyte.

Because the thickness/volume of the anode, and therefore the battery thickness, is reduced, more energy producing components can now be put into the volume not needed by the present invention but needed in thicker prior art anodes and lithium storage structures.

As a result, more energy producing components can occupy the freed-up volume, formerly needed by prior art anodes, to increase the energy density of the battery. Alternatively, the same energy storage now can be produced by a battery with a smaller volume/weight profile.

Embodiments of the invention enable flexible batteries that can be formed into different shapes, e.g., stacked, bent, rolled, applied to curved surfaces, etc. to create high density and fast charging energy storage devices and storage devices that can be physically configured into different form factors for different applications.

Many alternative economical, and scalable structures and methods are disclosed that, given this disclosure, enable easy and inexpensive manufacture of these energy storage devices.

As used herein, "plating" means deposition of lithium metal and/or lithium atoms/ions to form a lithium metal layer of variable thickness upon a surface. "Stripping" means the removal of lithium atoms/ions and electrons from the lithium metal layer causing the lithium metal layer to shrink. Plating causes the lithium metal layer to grow (become thicker) by converting lithium ions (by adding an electron) to lithium atoms added as lithium metal to the lithium metal layer. Stripping decreases the thickness of the lithium metal layer as lithium atoms (lithium ions and associated electron) leave the lithium metal layer.

Up until now, using a silicon (nano size or bulk-size or other semiconductor) substrate as an anode substrate has caused the failure modes as discussed above due to the volume cycling of the silicon substrate, lithium dendrite growth, etc.

This disclosure describes various embodiments that provide anode surfaces and thicknesses that repeatedly permit lithium metal layers to form (grow during charging and shrink during discharging cycles) with minimal or no mechanical failure effects on battery components or significant dendrite growth.

"Uniform" plating means that a lithium metal layer plated on a surface is a predominantly continuous lithium layer across the entire area of a surface. This lithium layer can be wavy and non-uniform in thickness or the thickness can be constant over the entire surface.

However, in some embodiments, the lithium metal layer forms on substantially all or all the surface, e.g., an anode surface, with all parts of the anode surface covered with the lithium metal layer.

It is thought that this uniform plating of the lithium metal layer, e.g., on the nucleation layer, prevents or largely inhibits dendrite formation, particularly when the surface of the lithium metal layer is smooth. The semiconductor layer (s) used as nucleation layers are smooth.

It has been observed that when plating lithium on unmodified copper or other metallic/conductive surfaces, the lithium does not plate with a uniform thickness and/or does not plate in a continuous/uniform layer. The lithium tends to aggregate in "globs" in some regions while leaving other (e.g., larger) areas/regions of the metallic surface exposed with little or no lithium on the metallic surface. This non-uniform plating performs poorly when used in an anode and probably contributes to low specific capacity and dendrite formation.

In some embodiments of the present invention, an anode is made by disposing a thin, crystal semiconductive layer on a conductive current collector layer. The semiconductive layer has a surface on which lithium nucleates, e.g., the lithium nucleates to first form a lithium seed layer on/in the semiconductor surface. A lithium metal layer then forms uniformly/continuously across the entire surface of the semiconductor layer, e.g., on the seed layer on/in the semi conductive layer. The lithium metal layer will grow and shrink during the charge and discharge cycling of the battery.

In some embodiments, the semiconductor layer is made from single crystal silicon. Accordingly, the semiconductor layer used as a nucleation layer will be referred to as a nucleation layer, silicon layer, crystal silicon layer, or single crystal silicon layer, etc. without loss of generality, even though other semiconductor materials and structures are envisioned for making the (thin, first, "I layer") semiconductor layer.

In some embodiments, the thin, crystal silicon layer has a porosity. The porosity (first porosity) has an average pore size large enough to form a lithium seed layer on the silicon nucleation layer surface but not large enough to promote lithium intercalation or a large amount of lithium storage within the silicon nucleation layer. As stated, none or minimum lithium will further intercalate within the silicon layer after the lithium metal layer is formed.

In addition, because of the smoothness of the silicon layer, the lithium metal layer will have a smooth surface and be uniformly/continuously spread over the semiconductor surface. As a result, dendrite formation will be greatly reduced or eliminated.

Since operation of the battery(ies) of the present invention, including battery charge and discharge cycling, does not rely on a thick silicon substrate to store lithium (because the majority of the lithium is stored in the lithium metal layer and not in the thin semiconductor layer), there is minimal intercalation in the semiconductor layer after the lithium metal layer is formed. Also, there is little or no volume cycling of the semiconductor layer. No thick substrate is needed to store lithium. Using thinner anodes, much thinner batteries can be made with high energy densities.

These invention embodiments have removed the need for thick semiconductor (e.g., silicon) substrates in the battery anode. Contrarily, any semiconductor layer used (if any) does not store large amounts of lithium but primarily acts to enable the lithium metal layer to form and grow (plating) and shrink (de-plating) during cycling.

In some embodiments, the semiconductor nucleation layer is porous with pores of such a size to enable a lithium seed layer formation that helps the more efficient formation of the lithium metal layer.

Accordingly, the battery anode is thin single crystal porous silicon layer, flexible, with little or no intercalation of lithium into the silicon.

Thus, the failure modes common in the prior art are reduced or eliminated. Further, the battery volume and weight that was formerly needed for thicker silicon substrates can now be used for additional thin anode battery structures and more energy storage.

Using the embodiments of the present invention increases the energy density of batteries (energy storage devices) by a factor of 2 to 10 or more.

Other embodiments, described below, use two or more single crystal semiconductor layers, sometimes each with different porosities, deposited on the anode current collector electrode. Still other embodiments, described below, use no semiconductor layers, and modify the conductive current collector surface to create a uniform lithium metal layer disposed on the current collector.

Some of these embodiments, use conductive current collector substrates made of materials that do not react with lithium.

Larger, e.g., thicker, cathodes can provide more lithium for the higher current densities enabled in these anodes with greater energy densities. However, thicker cathodes, while providing more lithium, can decrease the charging and discharging rates of the battery because of the increased time the lithium takes to migrate through the thicker cathode during charge/discharge cycles.

Embodiments are disclosed that use cathode thicknesses thin enough to enable fast battery charging while maintaining high current densities in the anode region.

DETAILED DESCRIPTION OF THE PREFERRED EMBODIMENTS

FIG. 1 is a cross section view of one embodiment of a battery anode region 100. The anode region 100 shows one of the multiple anode embodiments 175. In this embodiment 100, a current collector electrode 110 surface 150 of the current collector electrode 110 contacts a nucleation layer 120, on which a lithium metal layer 125 can form.

This anode embodiment 175 has a current collector electrode 110 with a thickness 111 and a conductive surface 150. In some embodiments, a nucleation layer of single crystal porous-Si 120 is disposed on or formed from the conductive substrate 110 surface 150. The nucleation layer 120 has a nucleation layer thickness 121, a nucleation layer surface 122, and is disposed/formed continuously/uniformly across the conductive current collector electrode.

The lithium metal layer 125 forms on the anode structure 175 and grows and shrinks during the charge and discharge cycles over the battery lifetime. The anode current collector electrode 110 has a thickness 111 that can vary depending on the application. In some embodiments, the anode current collector electrode thickness 111 is thin enough so that the anode current collector electrode 110 can be easily stacked, rolled, bent, and/or otherwise formed into multiple shapes to create various battery physical configurations.

The anode current collector electrode thickness 111 can be thicker to provide stiffness, structural integrity, large current carrying capacity, etc. Non-limiting examples of the conductive current collector thickness 111 are between 10 micrometers (urn) and 1 millimeter (rom) although other thicknesses are envisioned.

In some embodiments, the anode current collector electrode 110 is made of a conductive material that can be made to directly contact the lithium metal in the lithium metal layer 125 with little or no reaction with the lithium.

The chosen conductive electrode 110 material and the surface 150 need to enable the lithium metal layer 125 to plate on the anode current collector electrode 110 to form a continuous layer of lithium 125.

Non-limiting examples of the anode current collector electrode 110 material include copper, nickel, and platinum. These metals have little chemical reaction with lithium and do not support lithium dendrite growth. Other materials are envisioned, even those with some small surface reaction to lithium.

For example, materials that react with lithium to form a thin interface between the lithium layer 125 and the conductive substrate 110 can be used as long as the lithium metal layer 125 can grow and shrink and current can flow from the lithium metal layer 125 through the anode current collector electrode 110 and does not cause any significant loss in the battery performance. Use of thin films which may be continuous or discontinuous that provide nucleation sites for lithium plating, e.g., a layer of material, like gold (Au), silver (Ag), carbon (C) between the anode current collector electrode 110 and the lithium layer 125 are also envisioned.

Figure 9A:
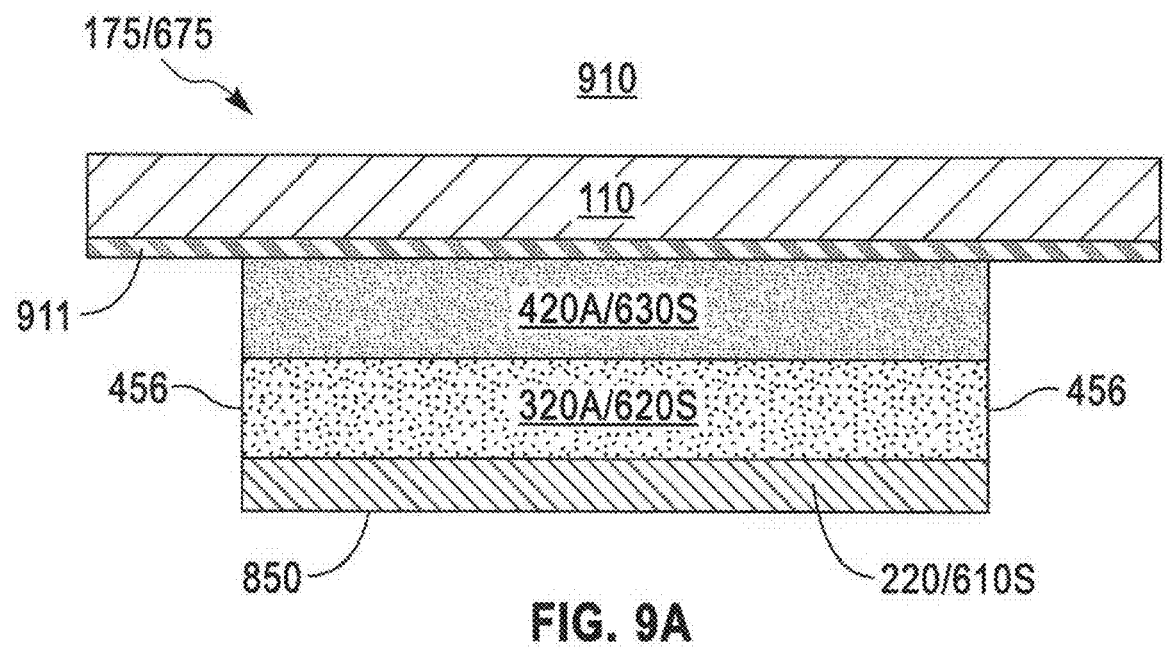
FIG. 9A is a block diagram of an interim anode structure after the layer release and attachment to the current collector.

In some embodiments a conductive epoxy impregnated with elements that do not react with lithium is used to glue the anode layer with the current collector 110. Refer to FIGS. 9C and D layer 911.

In some embodiments, particles of materials, e.g., like gold, silver, or carbon particles are deposited on the conductive substrate 110 surface 150 to act as a nucleation layer 120 and/or seed layer 126 to help form the lithium metal layer 125. The particles have an average diameter between 2 nm and 10 nm and have a spacing between particles 10 nm and 100 nm.

A non-limiting list of particle materials includes: gold (Au), silver (Ag), carbon (C), platinum (Pt), and titanium (Ti).

Without forming an array of uniformly distributed nucleation sites, the plated lithium layer is prone to develop dendrites.

In alternative embodiments, one or more contacts 115 are electrically connected to the conductive substrate 110. For example, the contact 115 may provide structural support for the battery in addition to an electrical connection, e.g., as a ground frame connection of a vehicle. The contacts 115 have a contact thickness 116.

The contacts 115 can be used to connect to external circuitry/loads and/or other batteries. (The conductive current collector 110 can also be used for this purpose.) Other embodiments of the contact 115 include one or more electrical buses that aggregate and conduct current from multiple batteries in series and/or parallel connections. Some connections are described below.

Figure 2:
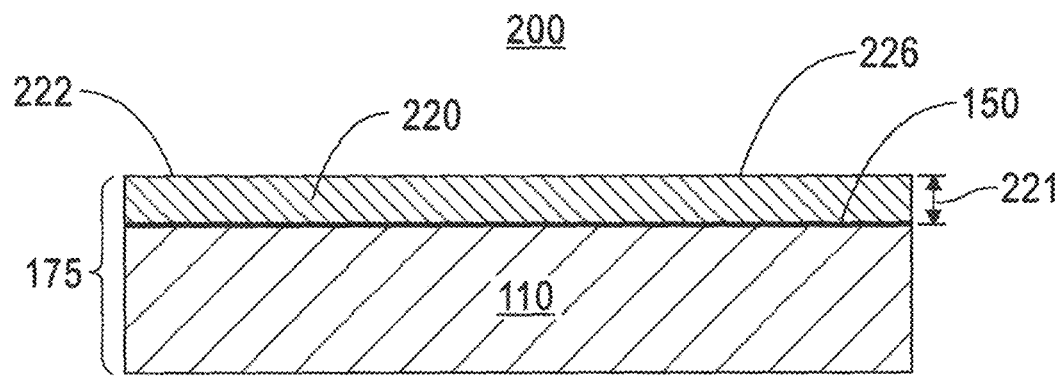
FIG. 2 is a block diagram of a cross section elevation of an anode used in a battery, e.g., an energy storage device, where the anode is made of a (thin, first) semiconductor nucleation layer with a first porosity disposed on a conductive current collector.

FIG. 2 is a cross section view of an alternative embodiment of a battery anode structure 200/175. The optional contact 115 and lithium metal layer 125 are not shown.

This anode 200 has an anode current collector electrode 110. The anode current collector electrode surface 150 is not smoothed in some embodiments and is smoothed in other embodiments. A thin, single crystal (optionally porous) semiconductor nucleation layer 220 is disposed on the anode current collector 110. The semiconductor nucleation layer 220 has a semiconductor nucleation layer thickness 221 and a semiconductor nucleation layer surface 222. The lithium metal layer 125 (not shown) forms on the semiconductor nucleation layer surface 222.

The thin crystal (porous) semiconductor nucleation layer 220 has a semiconductor nucleation layer thickness 221 between 20 nm and 200 nm. Other thicknesses are envisioned. The thin crystalline (porous) semiconductor nucleation layer 220 intrinsically has a smooth surface 222 with root mean square (RMS) roughness of less than 10 nm, or less than 1 nm RMS.

In some embodiments, the crystalline semiconductor nucleation layer 220 has an affinity to absorb lithium. In some embodiments, a lithium seed layer 226 forms on the semiconductor nucleation layer 220 surface 222.

In some embodiments, the crystalline semiconductor nucleation layer 220 is made of a single crystal material, like silicon (Si). The thin crystalline semiconductor nucleation layer 220 covers the conductive current collector 110 surface 150 uniformly/continuously.

The layer of lithium metal 125 forms on the semiconductor nucleation layer 220 surface 222 and/or on the seed layer 226. Since the semiconductor nucleation layer thickness 221 is less than 200 nm, it does not have enough volume to store large amounts of lithium and intercalation is prevented after formation of the lithium metal layer 125. Therefore, cracking and other failure modes of thicker silicon anode substrates are not relevant. The thin semiconductor nucleation layer 220 also enables the anode 200/175 to be flexible and formed into different geometries, e.g., curved sheets or rolls.

As stated above, particles of materials, e.g., like gold particles, can be deposited on the semiconductor layer 220/120 surface 122 to act as or add to the seed layer 126. Alternative embodiments of the semiconductor nucleation layer 220 provide additional advantages. In some embodiments, the thin semiconductor nucleation layer 220 has a porosity, e.g., a first porosity. In these embodiments, the voids or pores in the thin semiconductor nucleation layer 220 create additional void volumes in which lithium can accumulate to help form the lithium metal layer 125, e.g., by creating the lithium seed layer 226. The average void/pore diameter is large enough to enable the formation of the lithium seed layer 226 and/or lithium metal layer 125. However, the average diameters of the pores (in the first porosity) are small enough that little lithium intercalates. Therefore, weaknesses in the semiconductor nucleation layer 220 are avoided.

In some embodiments, the porosity of the semiconductor nucleation layer 220 has voids with an average diameter on the order of less than 5 nm or between 1 nm and 3 nm. Methods of making these pores are described below.

In some embodiments, the semiconductor nucleation layer 220 is. made of a single crystal. Non-limiting example crystal orientations of the thin single crystal porous semiconductor layer 220 include <100>, <110>, <111>, <211>, and <311>, etc. In some embodiments, the semiconductor nucleation layer 220 is made of thin single crystal porous silicon with an orientation of <100>.

In some embodiments, the semiconductor nucleation layer 220 is doped with a p-type dopant, such as boron, to create hole concentration of less than or equal to $10^{20}$ cm$^2$.

As described below, doping levels and chemical treatment steps can be used to control the pore size in the semiconductor layer 220.

Thus, some embodiments of this invention include a semiconductor nucleation layer 220 made of a single crystal with a single crystal orientation (e.g., <100>, <110> etc.) that has a first porosity and a thickness below 200 nm. This single crystal porous semiconductor layer 220 is disposed on the anode current collector electrode 110. There is no other semiconductor layer (in particular, no non-porous semiconductor layer) between the single crystal porous semiconductor nucleation layer 220 and the anode current collector electrode 110.

In some embodiments, the thin single crystal porous semiconductor layer 220 is disposed directly on the conductive substrate 110. In other embodiments, there is a thin non-semiconductor layer (not shown) between the single crystal semiconductor nucleation layer 220 and the anode current collector electrode 110 including a thin conductive adhesive and/or a thin coating layer on the conductive substrate 110.

Accordingly, the thin single crystal porous semiconductor layer 220 is flexible, and electrically and physically attached to the anode current collector electrode 110. Intercalation of lithium into the thin single crystal porous semiconductor nucleation layer 220 is greatly limited even though a small amount of lithium can accumulate in the small pores. Therefore, by controlling the pore size (porosity), enough lithium can enter the thin single crystal semiconductor nucleation layer 220 to form a lithium metal layer 125 and/or lithium seed layer 226 but not enough lithium enters to cause a large intercalation, volume growth (and shrinkage), and dendrite growth.

It is noted that while silicon is a preferred embodiment used for the thin 221 single crystal porous semiconductor nucleation layer 220, other materials can be used assuming they have the properties of enabling formation of a continuous lithium metal layer 125 over multiple charge (plating) and discharge (de-plating) cycles of the anode 200.

These other materials are likely to have similar properties to silicon like: capacity for lithium absorption, smoothness, porosity, crystallography, and/or doping.

Non-limiting examples of materials making the thin semiconductor layer 220 include: silicon, germanium, silicon-germanium, and III-V compounds.

Figure 3A:
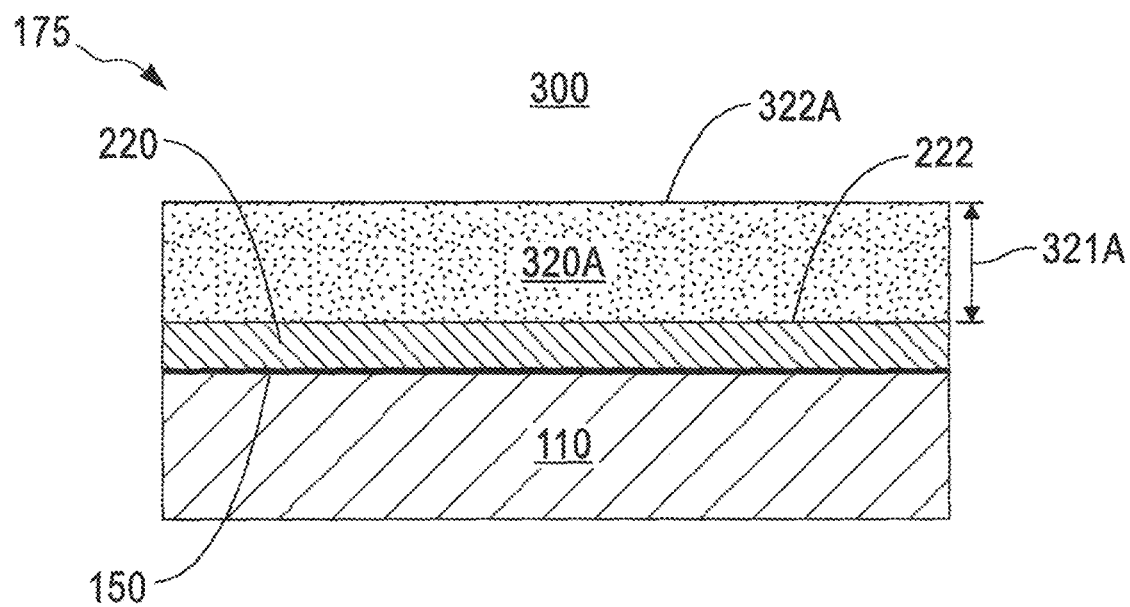
FIG. 3A is a block diagram of a cross section elevation of an anode used in a battery, e.g., an energy storage device, where the anode is made of a second semiconductor layer with a second porosity disposed on a thin semiconductive layer with a first porosity which is in turn is disposed on a conductive current collector.

FIG. 3A is a block diagram of a cross section elevation of an anode 300/175 used in a battery, e.g., an energy storage device, where the anode 300 is made of a thin 321A more porous semiconductor layer II 320A, that is disposed on a thin semiconductive layer (or layer I) 220 which is in turn disposed on an anode current collector electrode 110.

The thin semiconductive layer 220 is between 100 nm and 25 microns thick 221 and has a first porosity with an average pore diameter on the order of less than 5 nm, or between 1 nm and 3 nm.

Layer II 320A is a semiconductor layer with a layer II thickness 321A, a layer II surface 322A, and a second porosity. The semiconductive layer II 320A is between 0.1 micron and 25 microns thick and the second porosity has an average porosity of greater than 20, preferably between 30 and 40.

Layer II 320A is made of any of the materials that the thin semiconductor layer 220 can be made from, e.g., silicon.

In alternative embodiments, layer II 320A has a second porosity that is larger than the first porosity. In these embodiments, some lithium may intercalate in and through the layer II 320A structure while forming the lithium seed layer 226 on the surface 222 of the nucleation layer 220 and/or on the surface 322A.

Embodiment 300 currently is not a favored structure for use as an anode 175 per se. However, embodiment 300 is a structure that may be used in intermediate steps to construct energy storage devices, e.g., the anode current collector electrode 110 or other means can be used as (or with) a handler to "flip" the structure to become and embodiment like 350. In some embodiments, during the initial charge and discharge cycles of the battery, when this embodiment 300 is used in a battery, layer II 320A might be destroyed, e.g., might be pulverized by the volume cycling etc. caused by the intercalation of the layer II 320A. The pulverized layer II 320A then would be absorbed into the battery internals leaving the surface 222 exposed as the nucleation layer 220.

The lithium metal layer 125 then grows on the exposed nucleation layer 220 surface 222 and/or on the lithium seed layer 226.

Figure 3B:
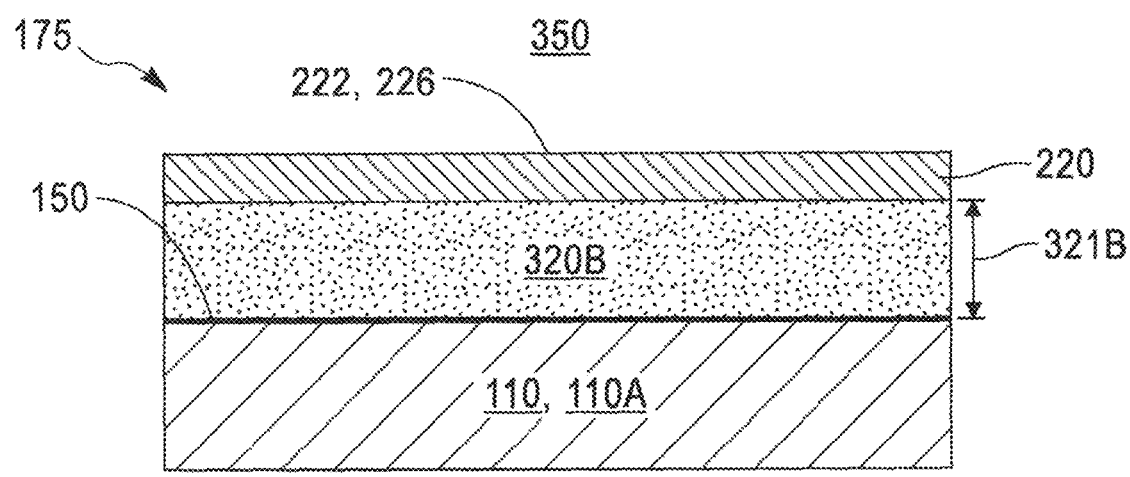
FIG. 3B is a block diagram of a cross section elevation of an anode used in a battery, e.g., an energy storage device, where the anode is made of a thin semiconductor nucleation layer with a first porosity disposed on a second semiconductive layer with a second porosity which is in turn disposed on a conductive current collector.

FIG. 3B is a block diagram of a cross section elevation of an anode 3501175 used in a battery, e.g., an energy storage device, where the anode 350/175 is made of a thin semiconductor nucleation layer 220 disposed on a more porous semiconductive layer II 320B, which is in turn disposed on a conductive current collector 110.

Layer II 320B is made of any of the materials that the thin semiconductor layer 220 can be made from, e.g., Silicon. Layer II 320B has a layer II thickness 321B between 0.1 micron and 25 microns. Layer II 320B is used in some embodiments to facilitate manufacture of the anode 3501175 and integration of the anode 3501175 into the battery as described below. Layer II 320B has a second porosity that is larger than the first porosity. The second porosity can have an average pore diameter below 10 nm or greater than 3 nm.

In these embodiments 350, the lithium metal layer 125 and, in some cases, the lithium seed layer 126, forms on the thin semiconductor nucleation layer 220 surface 222 as described above. Because the first porosity of the semiconductor nucleation layer 220 is small, after formation of the lithium metal layer 125, little or no lithium intercalates into layer II 320B.

Figure 4A:
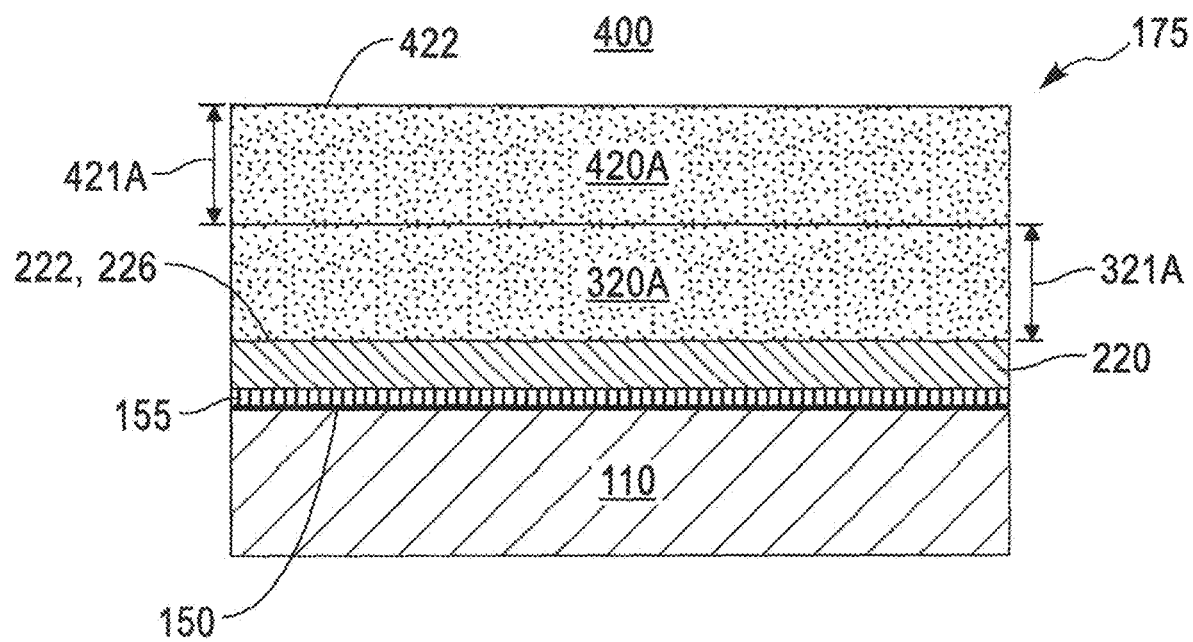
FIG. 4A is a block diagram of a cross section elevation of an anode used in a battery, e.g., an energy storage device, where the anode has a third layer with a very porous third porosity disposed on the structure in FIG. 3A.

FIG. 4A is a block diagram of a cross section elevation of an anode 400/175 used in a battery, e.g., an energy storage device, where the anode 400/175 has a third very porous layer disposed on the structure 300 in FIG. 3A.

In this embodiment, the thin semiconductor layer 220 has a low first porosity with an average diameter on the order of less than 5 nm or between 1 nm and 3 nm. Layer II 320A has a second porosity that is higher than the first porosity, e.g., 3 nm and 10 nm. Layer III 420A is what remains of a cleavage layer and has a high porosity of >30 of the volume of the layer III 420A. The layer III 420A thickness 421A is between 100 nm and 25 microns. The cleaving of layer III 420A is described below.

Embodiment 400 can also be used as an intermediate structure in battery manufacture. Uses of embodiment 400 in some batteries might require removal and/or pulverization of layer III 420A and layer II 320A.

The current collector electrode 110 has a surface 150. In some embodiments, an optional conductive adhesive layer 155 binds the surface 150 of the current collector 110 to the thin semiconductor layer 220.

Figure 4B:
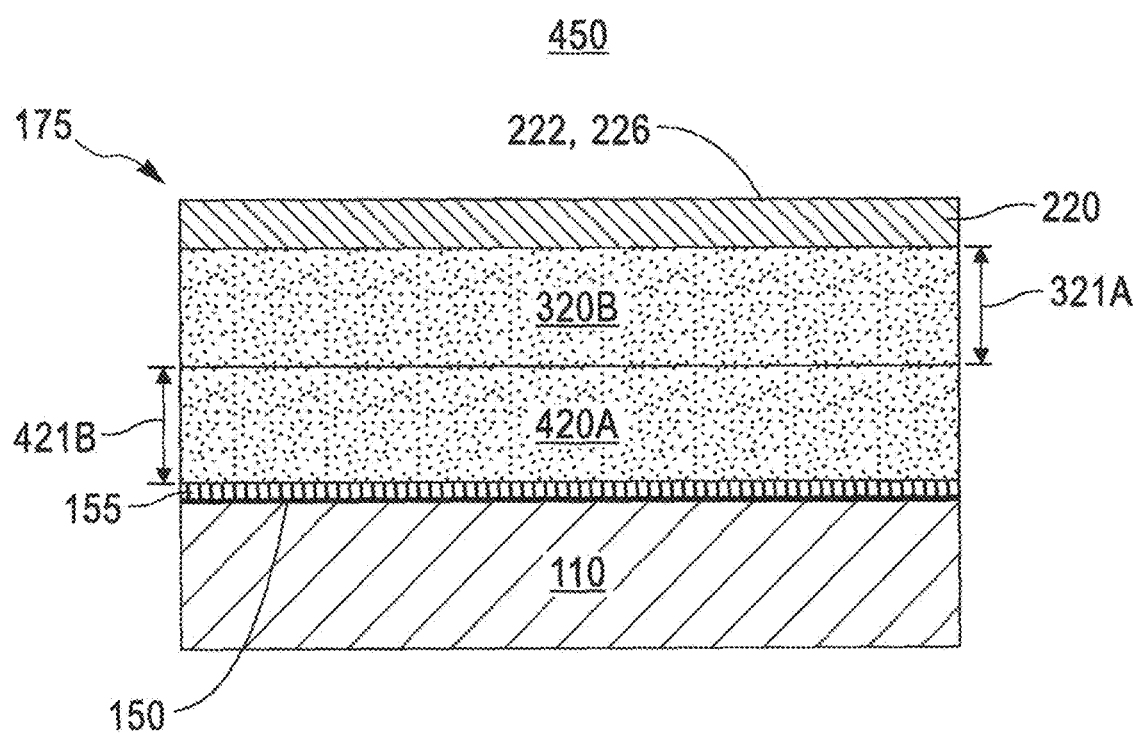
FIG. 4B is a block diagram of a cross section elevation of an anode used in a battery, e.g., an energy storage device, where the anode has the three semiconductor layers in FIG. 4A, where thin semiconductor nucleation layer with a first porosity disposed on a second semiconductive layer, which is disposed on a third layer with a very porous third porosity, all disposed on the anode current collector.

FIG. 4B is a block diagram of a cross section elevation of an anode 450 used in a battery, e.g., an energy storage device, where the anode 175 has the three semiconductor layers 220/320B/420A of structure 400 inverted and disposed on the anode current collector 110.

This structure 450 can be formed from structure 400 using handler operations similar to those described above.

In this embodiment, layer III 420A is what remains of a cleavage layer. The porosities and thickness of the layers are, as described above.

In this embodiment 450, the lithium metal layer 125 and, in some cases, the lithium seed layer 126, form on the thin semiconductor nucleation layer 220 surface 222 as described above. Because the first porosity of the semiconductor nucleation layer 220 is small, after formation of the lithium metal layer 125, little or no lithium intercalates into layers II 320B and III 420A.

Figure 4C:
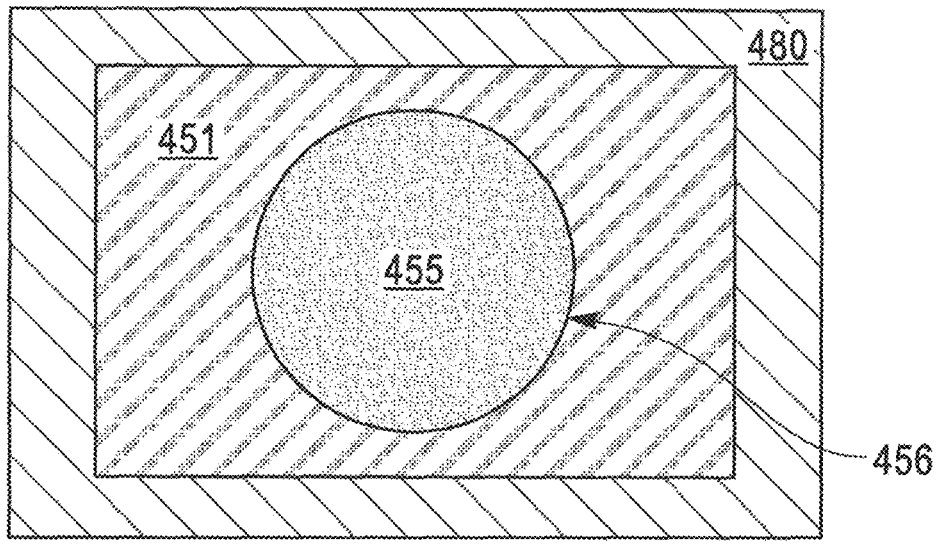
FIG. 4C is a top view representing any of multiple embodiments taught and/or contemplated in this disclosure, e.g., those shown in FIGS. 2, 3 and 4, and further showing one of the porous-Si region in a doped Si substrate.

FIG. 4C is a top view representing any of multiple embodiments of the porous layers of the any of multiple anode structures 175 taught and/or contemplated in this disclosure, e.g., layer I 220, layer II 320A/B, layer III 430A, prior to being stripped from the surface of a doped substrate 451, e.g., a doped silicon substrate 451.

Figure 8:
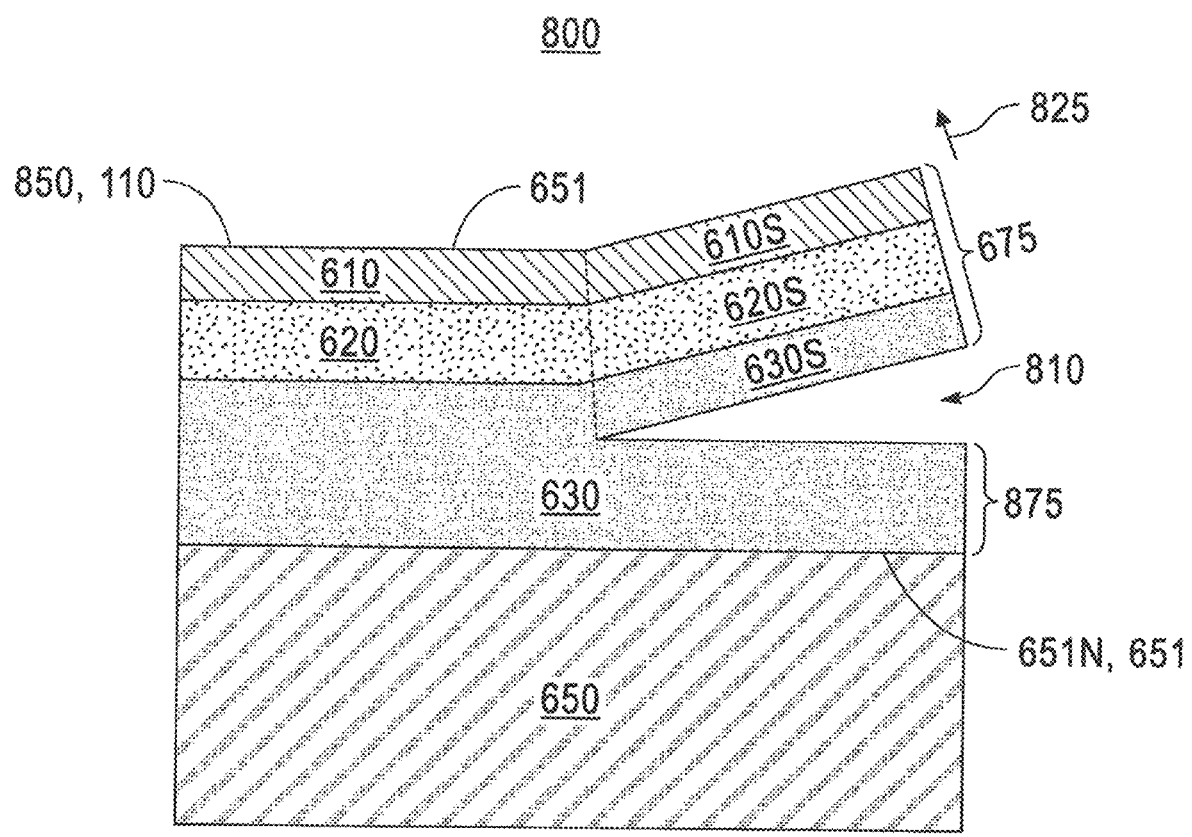
FIG. 8 is a block diagram of one interim semiconductor layer structure used to form released anode structures by using a release/cleavage layer.

A release tape 480 is adhering to the surface of the top of a bulk substrate 451 (651 shown in FIG. 8). The top 455 view of the layered structures 220/320A/320B/420A that are separated, in some embodiments, from the top of the bulk substrate 451 by a scribed edge 456.

The top view 455 of the layered structures (e.g. layer I, II, and/or III), top of the bulk substrate 451, and scribed edge 456 are shown in phantom view through the releasable tape 480.

The scribed edges of the porous-Si layer(s), top view 455 shown, are scribed prior to applying a releasable tape 480. In some embodiments, the releasable tape 480 covers the top 455 of the porous layer region within the scribed edge 456 and all or a part of the doped-Si substrate surface 451.

The shape of the scribed edge 456 can be any arbitrary shape, e.g., circular, rectangular, etc.

In some embodiments, forming and flipping combinations of layered structures depicted in 220/320A/320B/420A was reduced to practice by using the following steps: (i) scribe edges 456 of the porous region to facilitate the porous structure release, (ii) apply a releasable tape 480 (thermal or UV) on the surface of the porous layer structure 455 and doped substrate surface 451, (iii) pull tape upwards and continue pulling until the combination of porous region layers is detached from the doped-Si substrate, (iv) apply a non-lithium reacting conductive adhesive 155 on the current collector metal (e.g., Cu) 110, (v) apply the structure of the combination of porous region layers, after step (iii), that include the releasable tape 480 on the adhesive, attaching the porous region layers to the current collector metal with the conductive adhesive 155 (vi) let the conductive adhesive 155 dry and make a strong bond between the combination of porous region layers and the current collector 110, (vii) in the case of a thermal release tape 480, heat the structure of after step (vi) in the 90-120 C range to facilitate the release of the release tape 480 to create structures like 220/320A/320B/420A, and (viii) wipe the surface 451 with organic solvents including toluene, acetone, isopropyl alcohol, ethanol, and methanol to clean. FIGS. 8, 9A, and 9C further describe the flipping process and any further plating of the current collector 110.

Figure 5:
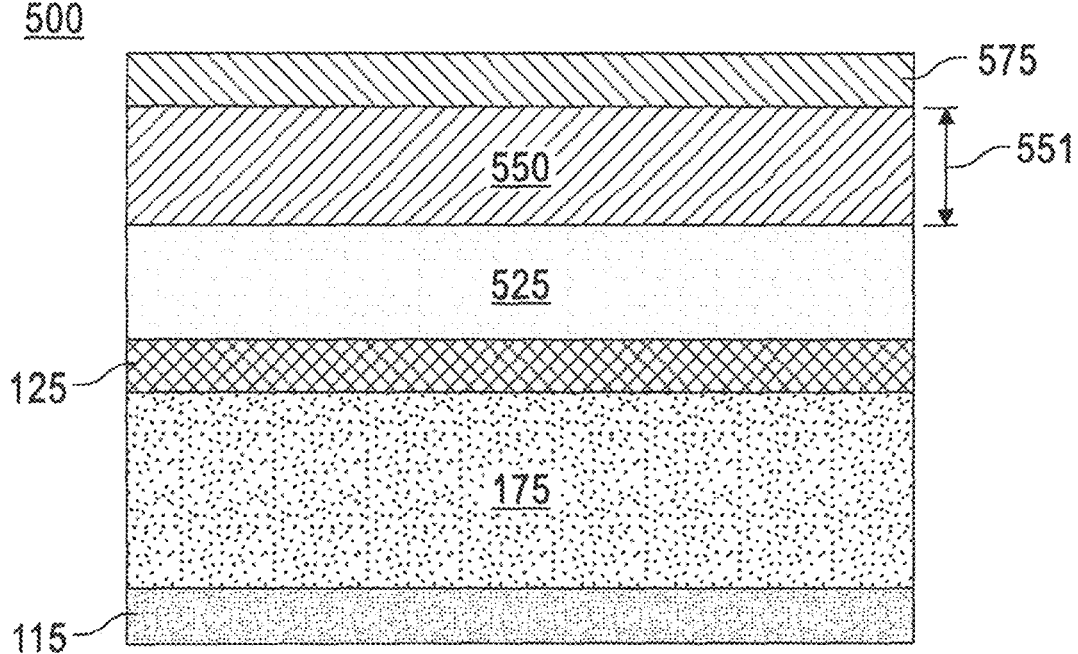
FIG. 5 is a block diagram of a cross section elevation of an energy storage device, e.g., a battery, using any one of the anode embodiments taught and/or contemplated in this disclosure.

FIG. 5 is a block diagram of a cross section elevation of an energy storage device 500, e.g., a battery 500, using anyone of the anode embodiments 175 taught or envisioned in this disclosure.

The anode 175 is optionally connected to one or more anode contacts 115. In alternative embodiments the anode contact(s) 115 can be omitted and electrical connection to the anode 175 is made directly to the anode current collector 110. In some embodiments, the conductive substrates 110 of one or more anodes 175 connects to the cathode contacts 575 of one or more other batteries in series and/or to anodes 175 of one or more other batteries in parallel. Other series/parallel electrical connections and battery assemblies are envisioned, some described below.

After the battery 500 is initially current cycled, a fully formed lithium metal layer 125 is disposed on the anode 175 as would be in the normal operational state of the battery. Once formed, the lithium metal layer 125 remains for the lifetime of the battery 500 even though the lithium metal layer 125 will grow and shrink in thickness during the charge and discharge cycles of battery 500 operation.

Initial current cycling refers to forcing current in and out of the battery 500 after the battery 500 (or combinations of the battery 500 in energy storage devices) is/are assembled.

In some embodiments, the current is varied in amplitude, frequency, and duration, gradually increasing in amplitude and/or duration to form the lithium metal layer 125 and in some embodiments the lithium seed layer 126 on which the lithium metal layer 125 grows.

The electrolyte/separator 525 is disposed on the anode 175 during construction/assembly of the battery 500. The lithium metal layer 125 forms between the electrolyte/separator 525 and the anode 175 during the initial current cycling of the battery 500. The electrolyte/separator 525 permits ionic (lithium ion) current flow between the anode 175 and cathode 550 but prevents most or all electrons from flowing between the anode 175 and cathode 550. Therefore, the electrolyte/separator 525 prevents the anode 175 from electrically shorting to the cathode 550 while allowing the lithium ions to flow between the anode 175 and cathode 550 during the battery charge and discharge cycles and the initial current cycling.

Various types of electrolyte/separators 525 are envisioned. The electrolyte/separator 525 can be in a liquid or solid-state form. Non-limiting examples of solid-state electrolyte/separator 525 materials include, polymer electrolytes, sulfide solid electrolytes (SSEs), argyrodite electrolytes, sulfur containing electrolytes like $Li_6PSsCI$, and LiPON ceramic type electrolytes.

The cathode 550 is disposed on the electrolyte/separator 525. The cathode 550 is made of lithium containing compounds and has a cathode thickness 551. Any known cathode 550 material that is a source for lithium is envisioned including catholytes. Non-limiting examples of cathode 550 material include lithium salts, LCO, NMC, LFP, and NCA and halides based catholytes, such as LiI (lithium iodide), GaF etc.

Generally, the thicker 551 the cathode, the more lithium is available in the battery 500. More battery 500 lithium enables the battery to store more energy, i.e., the batteries with more lithium can have a higher energy density. However, batteries 500 with thicker 551 cathodes 550 take longer to charge because some of the lithium diffuses a longer distance to move out Of the cathode 550.

As a result, in some battery configurations, thicker 551 cathodes 550 enable higher energy densities at the expense of longer charge times.

Due to the higher battery 500 energy densities and cheap/efficient manufacturing techniques enabled by the present invention, batteries 500 can be made with both high energy densities and rapid charge times.

For example, the surface area of the battery/cathode 500 can be increased to provide the same volume of cathode 550 (and lithium containing compounds) while keeping the cathode 550 thickness 551 thin enough to have fast battery charging. Also, thinner 551 and faster charging cathodes 550 can be used in batteries 500 that have multiple energy storage layers. Multiple energy storage layers fit in volumes/spaces no longer needed for thicker anodes. Accordingly, the increased number of energy storage layers increases the battery capacity, e.g., energy density, while enabling a faster charging time enabled by a thinner 551 cathode(s).

Non-limiting examples of cathode 550 materials include LCO, NMC, LFP, and NCA or halides based catholytes, such as LiI (lithium iodide), GaF, etc.

One or more cathode contact(s) 575 is/are disposed on the cathode 550.

The cathode contact 575 acts as a current collector for the cathode 575 and an electrical cathodic connection to outside circuitry. The cathode contact 575 is made of an electrically conductive material, e.g. a metal like aluminum. Materials and methods of making cathode 550 contacts 575 are known.

Non-limiting examples of materials used for making cathode contacts 575 include aluminum, and titanium (Ti).

Figure 6A:
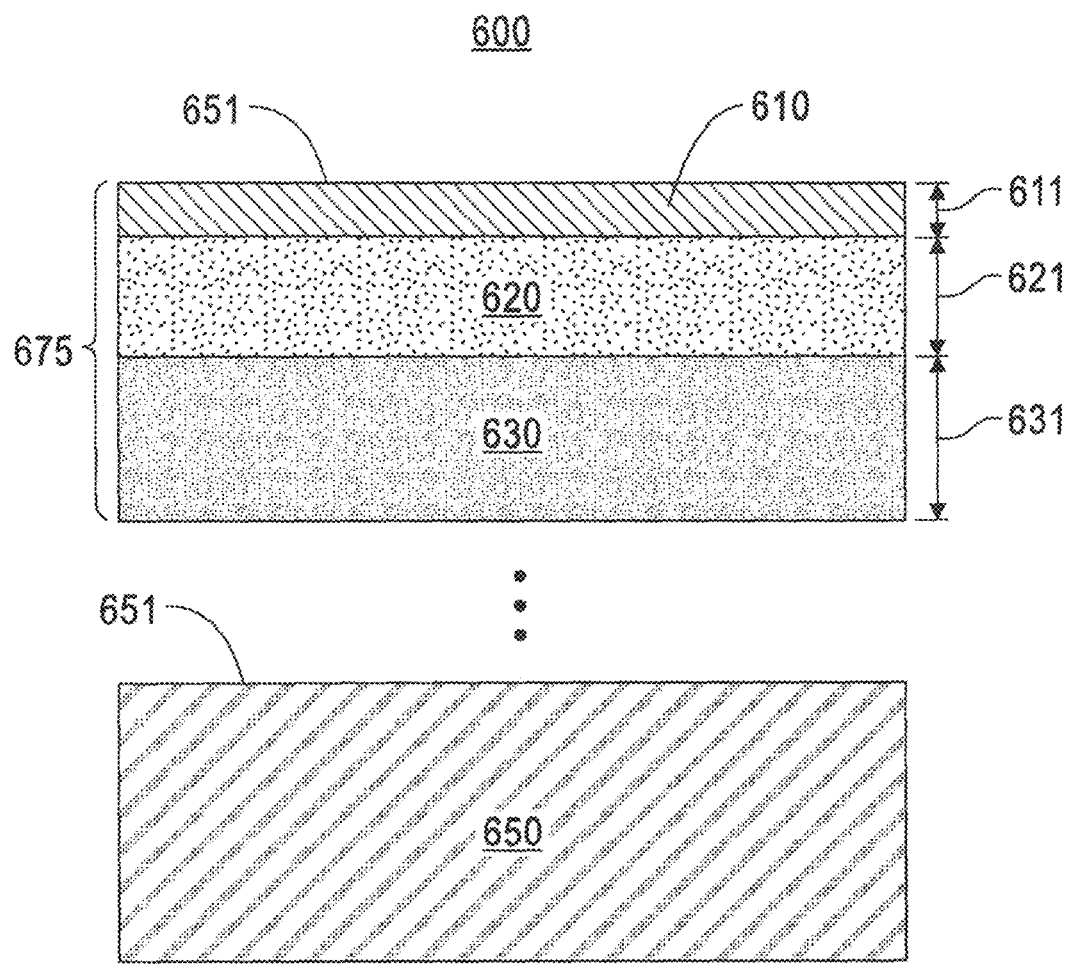
FIG. 6A is a block diagram one alternative interim semiconductor layer structure used to form anode structures with epitaxially grown layers with different doping levels, with a heavily doped top layer and a lightly dope lower layer.
Figure 6B:
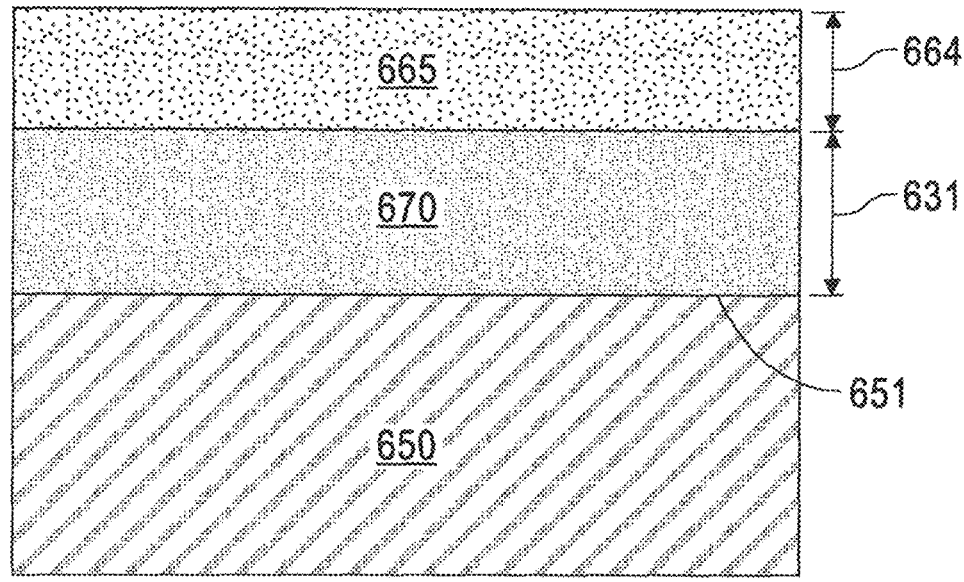
FIG. 6B is a block diagram of the alternative interim semiconductor layer structure with an anode structure formed with a single chemical application.
Figure 6C:
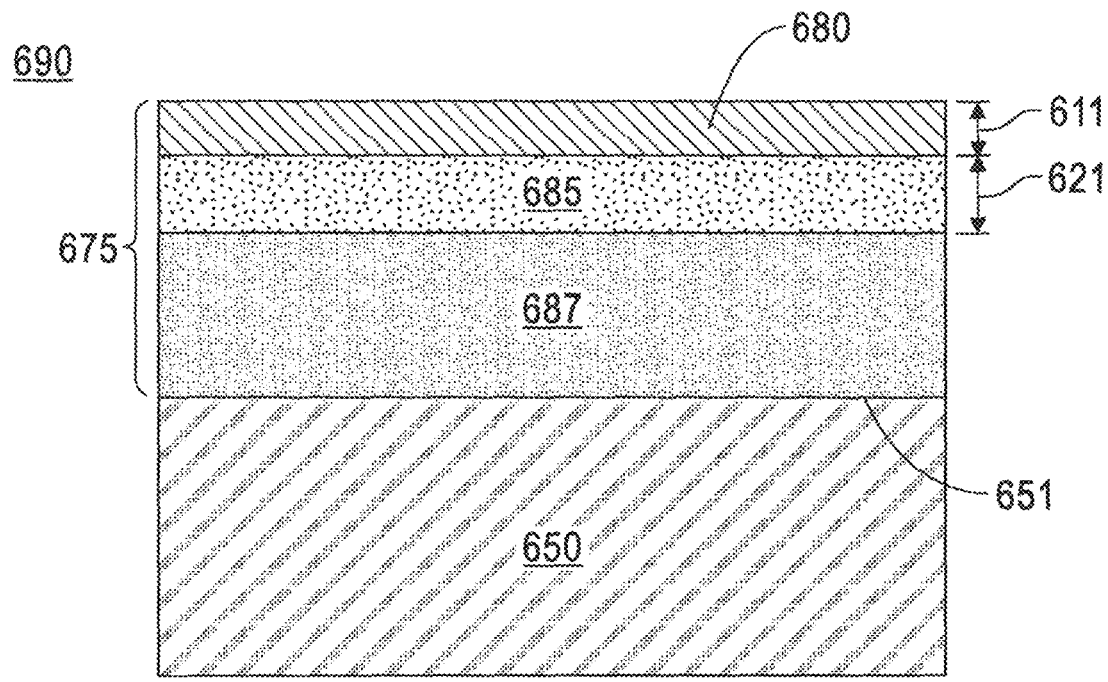
FIG. 6C is a block diagram of an alternative interim semiconductor layer structure having epitaxially grown layers with descending doping levels.
Figure 7A:
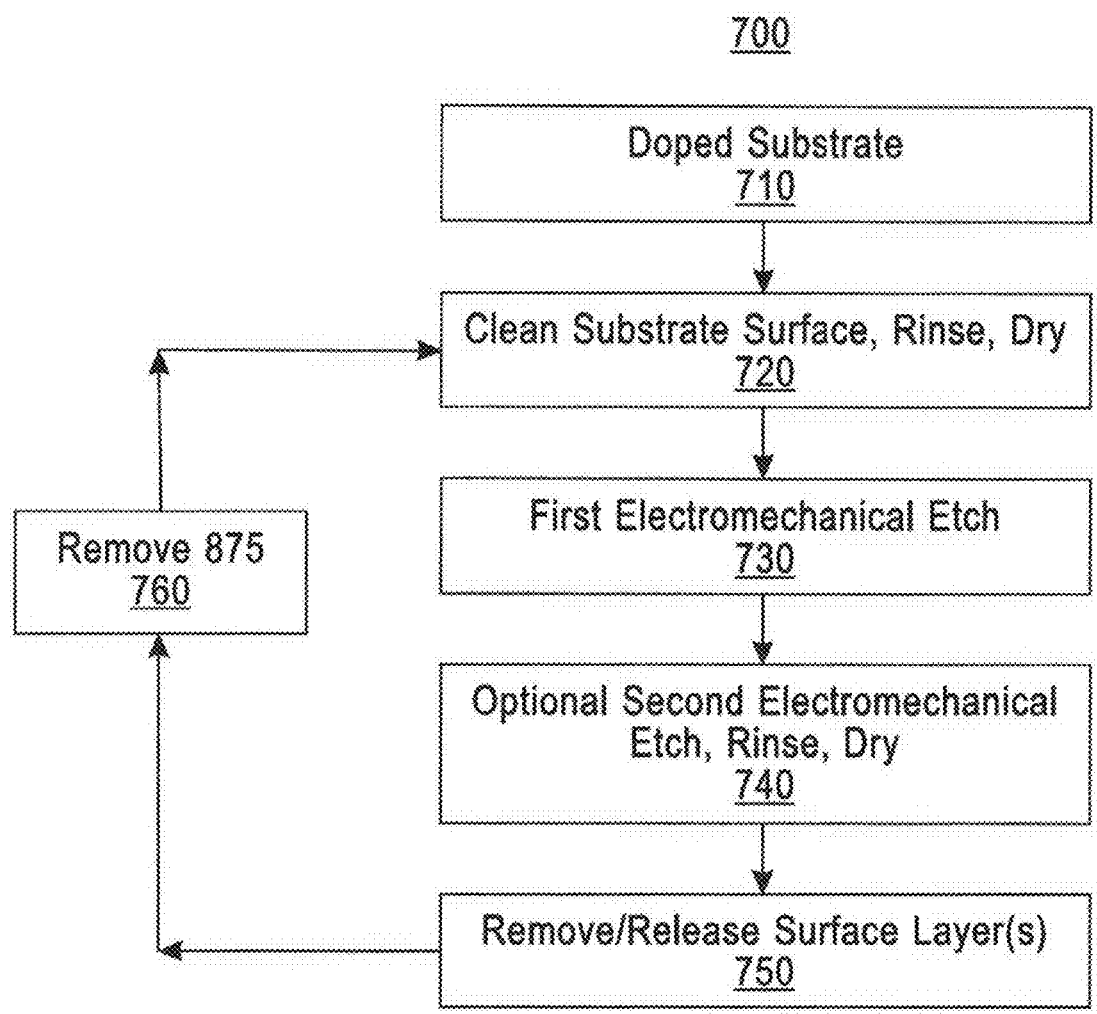
FIG. 7A is a flow chart showing the steps of flipping the thin anode structure.
Figure 7B:
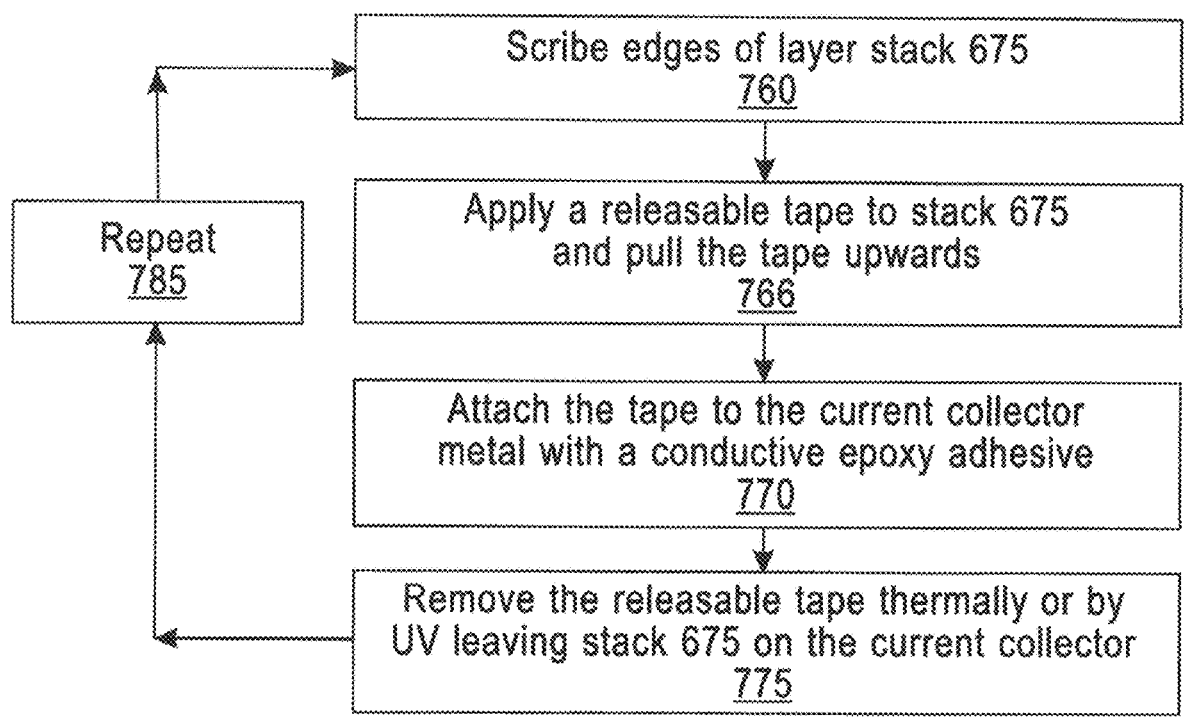
FIG. 7B is a block diagram of the alternative interim semiconductor layer structure including an anode structure formed with a buried cleavage layer.
Figure 7C:
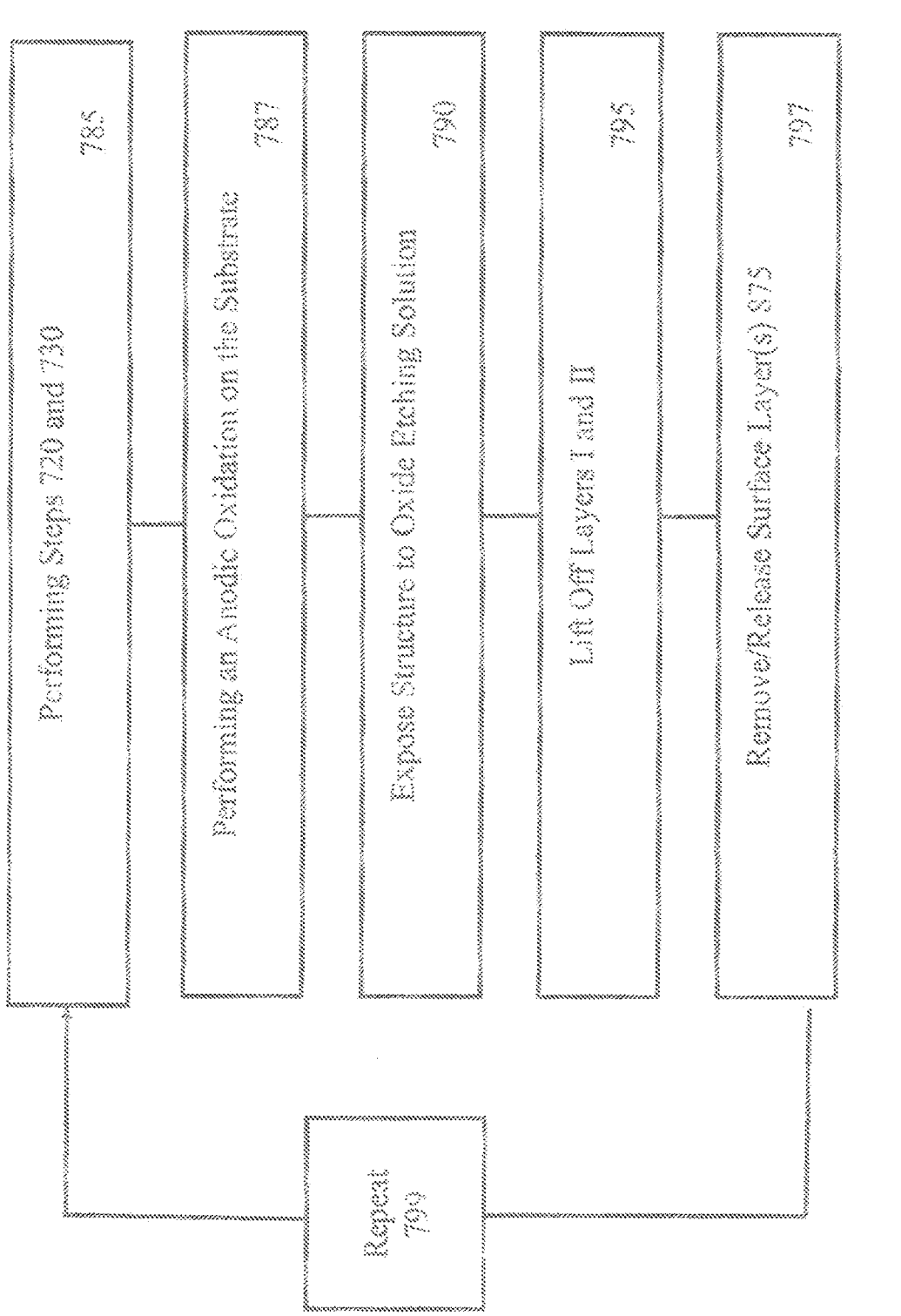
FIG. 7C is a flow chart for making an anode structure with the buried cleavage layer structure shown in FIG. 7B.

Considering FIGS. 6 and 7, FIG. 6 is a block diagram of one interim semiconductor layered structure 600 used to form anode structures 675.

Etching steps described in FIG. 7 create the one or more semiconductor layers that are used to make the various anode 175 structures 675.

By changing steps in the process 700 described in FIG. 7, different anode structures 675 can be made on top of the semiconductor layered structure 600. Once formed, the anode structures 675 are released from the interim semiconductor layered structure 600, e.g., at a cleavage layer, and leave the bulk substrate 650 which can be reused, as described below.

FIG. 6A is a block diagram one alternative interim semiconductor layer structure 660 used to form anode structures 675 with epitaxially grown layers 680/685/687 with different doping levels, starting with a heavily doped top layer 665 and a lightly dope lower layer 670. Higher doping levels enable high density, smaller pores used in embodiments of the nucleation layer 680. Similarly, lower doping levels enable lower density, larger pores.

Part of the cleavage layer (a remaining cleavage layer, 875 below in FIG. 8) remains on the top of the bulk substrate 650 after each anode structure 675 is released (removed). See the description of FIG. 8.

To clean the top of the bulk substrate 650, the remaining cleavage layer 875 left on the bulk substrate 650 (after layer(s) 675 are cleaved/stripped) is removed by one or combination of the following techniques: (i) chemical, (ii) mechanical, (iii) physical sputtering, (iv) reactive ion etching, and (iv) high temperature thermal treatment in various ambient gases including but not limited to Hz, Ar, $N_2$, $O_2$, $H_2O$. Other known removal methods are envisioned.

Once the remaining cleavage layer 875 is removed, the process 700 (see FIG. 7) repeats to create a next anode structure 675 on the cleaned semiconductor layered structure 600/bulk substrate 650.

Optionally, an interim semiconductor layered structure 600 can be grown epitaxially using known methods.

In some embodiments, the structure 600 is doped with a p-type dopant, like boron, to obtain a resistivity of less than 0.1 ohm·cm, or in the resistivity range of 0.05 ohm-cm to 0.01 ohm-cm, or between 0.05 ohm-cm to 0.005 ohm-cm.

In some embodiments, p-type doping (e.g., boron) creates hole concentration of less than or equal to $10^{19}$ $cm^{-3}$. N-type doping also can be used but light energy is required to create the electron-hole pairs in this case. Some embodiments of the doping make the layers 610/620/630 and the bulk substrate 650 electrically conductive.

Higher doping levels are achieved more easily if the interim semiconductor layered structure 600 is made of a single crystal, e.g., crystalline silicon. In some embodiments, the bulk substrate 650 is crystalline silicon with a given crystal structure including but not limited to a single crystal (one crystal orientation) structure of <100>, <110>, <111>, etc. In some embodiments the crystal structure is <100>.

When formed on the top surface 651 of the bulk substrate 650 (see description of FIG. 6), the first, thin semiconductor layer 610 has a thickness 611; the second, type II layer 620 has a thickness 621; and the optional third type III layer 630 has a thickness 631. In some embodiments, the thicknesses 611/621/631 of the layers 610/620/630 range from hundreds of angstroms to several microns. These very thin semiconductor (e.g., single crystal silicon) layers are semiconductor membranes/anode structure 675 used to form some of the anode 175 embodiments discussed above. Depending on the steps used in process 700 in FIG. 7, the type III layer 630 (release layer) is optional for a given anode structure 675.

The first (layer I), thin semiconductor layer 610 can have a thickness 611 between 50 nm and 200 nm and a first porosity with an average pore diameter less than 5 nanometers (nm). The second, type II layer 620 can have a thickness 621 between 100 nm and 25 microns and a second porosity of greater than 3 nm.

If formed, the third layer, type III layer 630, is a cleavage layer. The third layer 630 has a thickness between 100 nm and 25 microns and a high third porosity of greater than>30.

FIG. 6C is a block diagram one alternative interim semiconductor layer structure 660, used to form anode structures 675, with epitaxially grown layers 665/670, each of the layers 665/670 having a different doping level.

The bulk substrate 650 can be formed as described above. As a non-limited example, the bulk substrate 650 is a single crystalline silicon doped with a p-type dopant, like boron, to obtain a resistivity of less than 0.1 ohm-cm, or in the resistivity range of 0.05 ohm-cm to 0.01 ohm-cm, or between 0.05 ohm-cm to 0.005 ohm-cm. The doping has a hole concentration of less than or equal to $10^{19}$ cm$^{-3}$ for the resistivity range of greater than 0.01 ohm-cm. Other materials and doping levels are envisioned.

This embodiment of the layer structure in 660 is created by epitaxial growth of silicon on bulk-Si substrate 650 with varying concentrations of boron. As the epitaxial growth of the structure 660 continues, a lightly doped layer 670 forms on the bulk substrate 650 surface 651. The dopant type of lightly doped layer 670 is the same as that of the bulk substrate 650 but the doping concentration is lower. In some embodiments, the doping level of the lightly doped layer 670 is below $10^{19}$ cm$^{-3}$ or between $10^{15}$ cm$^{-3}$ and $10^{17}$ cm$^{-3}$. The thickness of the lightly doped layer 670 is approximately the same as thickness 631 of layer III 630. Other doping types, concentrations, and thicknesses are envisioned.

In alternative embodiments, the lightly doped layer 670 can also be made of a different material than that of the bulk substrate 650. For example, the lightly doped layer 670 can be made of silicon-germanium (SiGe) with a less than 30 concentration of germanium or a Ge concentration of between 15 and 30.

As will be seen, the lightly doped layer 670 is made to be distinct/selectable from the heavily doped layer 665 in a later etching process.

As the epitaxial growth of the structure 660 continues still further, a heavily doped layer 665 grows on the lightly doped layer 670. The heavily doped layer 665 has a thickness 664 approximately equal to the sum of the thicknesses 611/621 of the thin semiconductor layer, layer I 680 and the type II layer 685. The dopant type of the heavily doped layer 665 can be the same as that of the heavily doped layer 670 and/or bulk substrate 650, e.g., a p-type dopant. The dopant concentration of the heavily doped layer 665 is higher than that of the lightly doped layer 670 or on the order of that of the bulk substrate 650, e.g., $10^{20}$ cm$^{-3}$. Other doping types, concentrations, and thicknesses are envisioned.

FIG. 6B is a block diagram of the alternative interim semiconductor layer structure 690 including an anode structure 675 formed with a single chemical application from structure 660.

In this embodiment, the anode structure 675 (all three layers I 680, II 685, and III 687) is (are) created with a single, first etch, step 730 of process 700 (see FIG. 7) and without the need of the second etch, step 740. Different p doping levels in the embodiment using epitaxially grown silicon layers create correspondingly different porosities in the silicon during electrochemical etching. The lower the p doping level, the larger the pore size. Therefore, a cleavage layer with porosity equivalent to that of 630 can be created by the same etch solution by decreasing of doping in layer 670. Since the doping level of layer 665 is equivalent to that of substrate 650, porous layers I and II are created that are similar to those describe above. Once the anode structure 675 is released from the substrate structure 690, the remaining type III layer 687/875 (see FIG. 8) is cleaned off the bulk: substrate 650 to allow the bulk: substrate to be reused. The lightly 670 and heavily 665 doped layers are then epitaxially grown and the process repeats to form a next anode structure 675.

FIG. 7 is a flow chart of embodiments of a process 700 of making thin anode 175 structures 675 for lithium batteries 500.

In step 710, the process 700 starts with a doped bulk: substrate 6001650, e.g., an interim semiconductor layered structure 600.

In step 720 the surface of the bulk: substrate 650 is cleaned. Any remaining cleavage layer 875 is removed as described below in the description of FIG. 8. A further cleaning, like an RCA 1 clean, is performed after the remaining cleavage layer 875 is removed. For example, the remaining bulk: substrate 650 is exposed to tetra-methyl ammonium hydroxide (TMAH) at about 50 degrees Celsius (C) for a few minutes to remove layer 875. The remaining bulk: substrate 650 is rinsed, for example with deionized water, and dried, for example with a N2 blow dry.

In step 730, a first electrochemical etch is performed. For example, the top surface 651 of the bulk substrate 650 is placed as an anode in an electrochemical bath. In some embodiments, the bath has a metallic cathode, e.g., made of platinum, and an electrolyte solution. The electrolyte solution can be a 49% hydrofluoric (HF) solution, or 40-50 HF solution. The top surface 651 is exposed to the first electrochemical etch/bath for between 30 seconds and 36000 seconds (e.g., 10 hours). An electric voltage across the bulk substrate 650 and the metallic cathode is adjusted to maintain a constant current between 1 mA/cm$^2$ and 50 mA/cm$^2$, or between 1 mA/cm$^2$ and 10 mA/cm$^2$.

Step 730 creates both the thin semiconductor (type I) layer 610 and the type II layer 620 at the surface 651 of the bulk substrate 650 in structure 800 described in FIG. 8.

If required, step 740 is performed to create the type III layer 630. In step 740, the top region of the bulk substrate 650 is exposed to a second electrochemical etching/bath. In this second bath, the bath electrolyte solution is a mixture of dilute HF and ethanol, for example in a 1:1 volume ratio. A constant current of between 20 mA/cm$^2$ and 60 mA/cm$^2$ is applied. Once the second etch/bath is completed, the bulk substrate 650 is rinsed and dried.

In step 750, the anode structure 675 is released. To create a next anode structure 675, repeat the process 700 again starting at step 720, after the remaining 875 is removed 760 from the bulk substrate 650 in step 760. (Refer to FIG. 8 as well.)

There are alternative ways to facilitate easier release 750 of the anode structure 675 in step 750. The non-limiting examples include the following:

1. Applying an ultrasonic treatment to release the porous layers.
2. Applying an ultrasonic treatment in conjunction while pulling the porous layers by a tape.
3. Applying am electrostatic force to release the porous layers.
4. Applying an electrostatic force in conjunction while pulling the porous layers by a tape.
5. Applying a high-pressure water jet to release the porous layers.

FIG. 7A is a flow chart of a process 795 showing the steps of using a reusable adhesive tape 480/850/110 to flip the layer stack 675.

In step 760, edges of the porous regions are scribed with a diamond (or SiC) scriber to scribe and define a shape 456 encompassing one or more of the layers 680/685/687 in the layer stack 675.

In step 766 a releasable tape (e.g., thermal or UV) is applied over the scribed porous region 456 as shown in FIG. 4C. Then the tape is pulled upward to release either porous regions I 680 and II 685 only or all regions I 680, II 685, and III 687. Which layers 680/685/687 are released depends on the porosity of the respective layer and where the cleavage occurs.

In step 770, the stack of released porous layer/releasable tape is glued to the current collector 110, e.g., by a conductive epoxy containing Ni or Cu or any other metal that does not react with lithium.

This results in the anode structure 675 being sandwiched between the releasable tape 825 (e.g. attached to layer I) and the current collect 110 (e.g. attached to layer III).

In step 775 the removable tape 480 is removed and the layer stack 675 remains conductively adhered to the current collector 110 but inverted. The removable tape 480 is removed by known processes, e.g., a heat treatment applied for thermal release tape or a UV treatment applied to remove the tape 480. The layer stack 675 (e.g., porous Si layers with either layers I and II or all layers I, II, and III) has the desired layer structure for the anode, i.e, facing up (opposite/away from the current collector 110) with the porous Si layer stack 675 attached to the current collector 110.

In step 785 the process sequence 760-775 is repeated to reuse of the silicon substrate 650. The surface of the silicon substrate 650 is cleaned, as described herein before steps of process 795 are repeated 785.

FIG. 8 is a block diagram of one interim semiconductor layer structure 800/600 used to form various released anode structures 675 by using a release layer 630 or 620.

In some embodiments, the anode structure 675 is removed from the top of the bulk substrate 650 by first attaching a tape 850 (or tape-like structure) to the top surface 651 of the anode structure 675 (and top 6510fthe bulk substrate 650), pulling 825 the tape 850 away from the bulk substrate 650 surface 651 and causing a tensile stress on the cleavage layer (630 or 620) that cracks 810 the cleavage layer. Continuing the tape pulling 825 propagates the crack 810 through the cleavage layer 630/620 (and/or the buried oxide layer 765 that is dissolved fully or partially) until the anode structure 675 is removed/released from the bulk substrate 650.

In some embodiments, the tape is a non-conductive or conductive tape 850 that is attached to the anode structure 675 surface 651 by an adhesive, e.g., a conductive adhesive, not shown.

The tape can have the adhesive on the contact side of the tape or the adhesive can be applied between the tape 850 and the anode structure 675 surface 651. The tape can be removable. For example, the adhesion can be changed, e.g., by application of ultra-violet (UV) light, temperature, a solvent, etc. to enable release of the tape 850 from the anode structure 675 surface 651 after the anode structure 675 is released/removed.

Removable tapes 850, like UV or thermal tapes, etc. are known.

After the anode structure 675 is removed the remaining cleavage layer 875 remains on the bulk substrate 650. Removing the remaining cleavage layer 875, as described above, creates a new bulk substrate 650 surface 651N/651 and ultimately a new anode structure 675 surface 651N for the next anode structure 675 to be created and released. As such, the interim semiconductor layer structure/bulk substrate 600/650 can be reused over and over. In alternative embodiments, the tape 850 will remain attached to the anode structure 675 either for the next processing steps or permanently. For example, the tape 850 can be made of a conductive material like a copper, nickel foil, stainless steel, etc. and the adhesive can be a conductive adhesive. In these embodiments, the tape 850 (or 825) can remain adhered to the anode structure 675 surface 651, i.e., the top surface 651 of the thin semiconductor layer 610/610S.

In some embodiments, the electrically conductive tape 850 releases the anode structure 675 and remains electrically and physically connected (by the conductive adhesive between the thin semiconductor layer 610 surface 651 and the tape 850 (e.g., tape surface 150). Here the tape 850 serves as the conductive substrate 1 current collector 110, as well. Note that the conductive substrate surface 150 also can be modified, e.g., smooth, seeded, plated, etc. as described above. In some embodiments, the tape 850 is made of a metal e.g., copper and/or nickel with the glue that does not react with lithium.

Note as described below, the tape 850 can be long and/or wide enough to release multiple anode structures 675 from multiple interim semiconductor layered structures 600, bulk substrates 650 simultaneously and/or sequentially.

Again, the interim semiconductor layer structure 600 is processed by the process steps in process 700 to produce the layers 610 and 620 and optionally layer 630 (or buried layer 765) on the top surface 651 of the interim semiconductor layer structure 600.

In some embodiments, the tape 850 is attached to the top surface 651 with an adhesive (not shown) between the contact surface 150 of the tape 850 and the top surface 651. The force 825 applied to the tape 850 initiates a crack 810 at the scribed perimeter which facilitates the release of the cleavage layer 630/620. In some embodiments, the cleavage layer 630/620 has a high porosity and is weaker than layers 610 and 620 and the bulk substrate 650 so that the crack 810 starts and continues through this layer. In some embodiments where the second porosity in layer II 620 is high enough to initiate a crack 810 at the scribed perimeter 456 which facilitates the release of layer 620, the layer II 620 can be the cleavage layer 620 and there is no need to perform step 740 that forms layer III 630. As stated, in embodiments with a buried layer 765, the buried layer 765 partially or fully dissolves.

As the crack 810 continues to propagate, the layer above the crack 810 splits away/separates from the bulk substrate 650/interim semiconductor layer structure 600. Therefore, the split thin semiconductor layer 61 OS, split layer II 620S, and optional split layer III 630S are part of their associated layers that begin the formation of the anode structure 675. The crack 810 continues to propagate through the cleavage layer 630/620 until the anode structure 675 completely separates from the bulk substrate 650 while still being attached to the tape 850. The remaining cleavage layer 875 remains part of the bulk substrate 650.

Other separation methods for removing the anode structure 675 are envisioned.

As stated, the remaining cleavage layer 875 is removed by processes like those explained above leaving a new top surface 651N of the bulk substrate 650. The new top surface 651N/651 is now the current top surface 651 of the bulk substrate 650 so that process 700 can be repeated on the bulk substrate 650 to produce the next anode structure 675.

In this manner, a plurality of anode structures 675 can be created from the same bulk substrate(s) 650/interim semiconductor layer structure(s) 600.

In some embodiments, after the formation of structures of FIGS. 3A, 3B, 4A, and 4B, these structures are subjected to electrochemical pre-lithiation to introduce enough lithium in the thin silicon anode that is consumed during both the formation of a solid electrolyte interphase (SEI) layer as well as in various reactions with battery components (electrolyte, cathode degradation etc.) during charge/discharge cycles. Such consumption of lithium is well known in the prior art. Such a process allows both an increased capacity as well as longevity of the battery. This process has been reduced to practice and has clearly demonstrated a greater than 10% improvement in the battery performance (increased capacity and charge/discharge cycles). The electrochemical lithiation is typically performed by placing the structures 300/350/400/450 in a separate electrochemical cell (also known as a split cell) at about 4-4.5 V until the voltage drops to less than 0.2 V and is then continued for greater than 5 hours to allow lithium to soak and plate on the silicon anode. In some embodiments, the structures 300/350/400/450 are attached to the conductive tape 850 after separation and when the anode structure 675 is put into the bath. The Si anode structure 675 serves as a cathode and lithium metal is used as an anode with an electrolyte and separator in between. The lithium will plate primarily on layer I and some lithium may leak through to layers II and III during the electrochemical lithiation. The anode structure 675 is then removed from the electrochemical cell and is introduced into a coin cell for charge 1 discharge cycles. Current densities of between 8-10 mA/cm$^2$ have been demonstrated in initial cycles. Pre-lithiation process can also be accomplished by alloying lithium metal with the thin silicon anode. A thin sheet of lithium (approximately less than 100 μm) is attached to the Si (lithium is malleable) and the alloying is done by placing Si/Li with Si sitting on a hot plate inside a glove box at less than 200° C.

FIG. 9A is a block diagram of an interim structure after the anode structure 675 is released. The anode structure 675 was released/stripped by the pulling on the releasable tape 850, as described above.

In some embodiments, the releasable tape 850 acts as a handler to position the anode structure 675 so that the current collector 110 can be attached to the anode structure 675. In this embodiment, the current collector 110 attaches to the layer III, 420A/1630S with a conductive adhesive 911.

The conductive adhesive 911 does not react with lithium. In embodiments where the releasable tape 850 is removed, e.g., by heating, UV light, etc., the anode structure 675 remains electrically connected to the current collector 110 through the conductive adhesive/epoxy 911. In addition, after removal of the releasable tape 850, the current collector 110 can be used as a new handler and the anode structure 675 has essentially been "flipped" with the current collector being physically and electrically connected to the layer III 420A/630S (or in some embodiments layer II 320A/620S) and where the thin semiconductor layer 220/610S is exposed. Accordingly, the resulting configuration (after releasable tape 850 removal) can be placed in the battery 500 directly as an anode 175, e.g., in configuration 350/450 where the thin semiconductor layer I 220/610S is exposed to lithium. See also FIG. 9C.

Figure 9B:
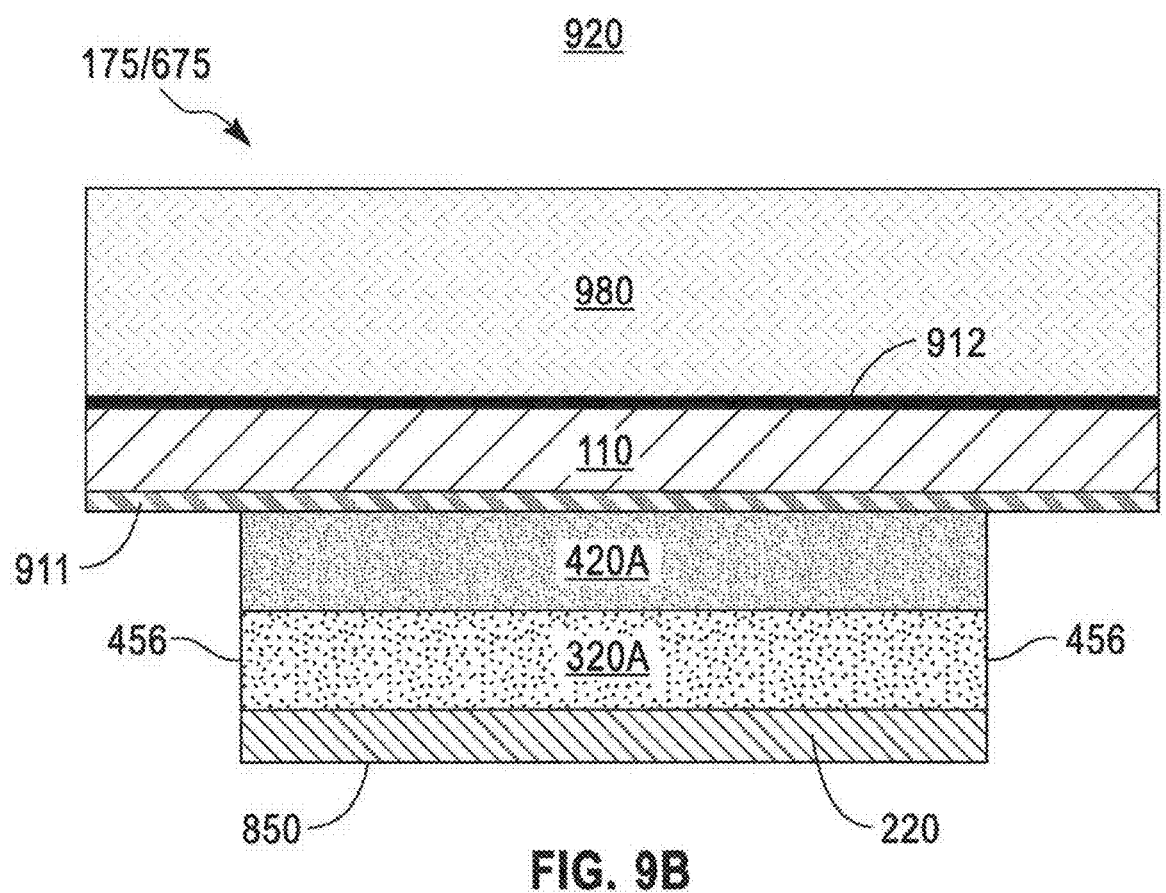
FIG. 9B shows the anode structure which has been flipped on the current collector including the addition of a plating layer on the current collector to add strength to the current collect for better handling later.
Figure 9C:
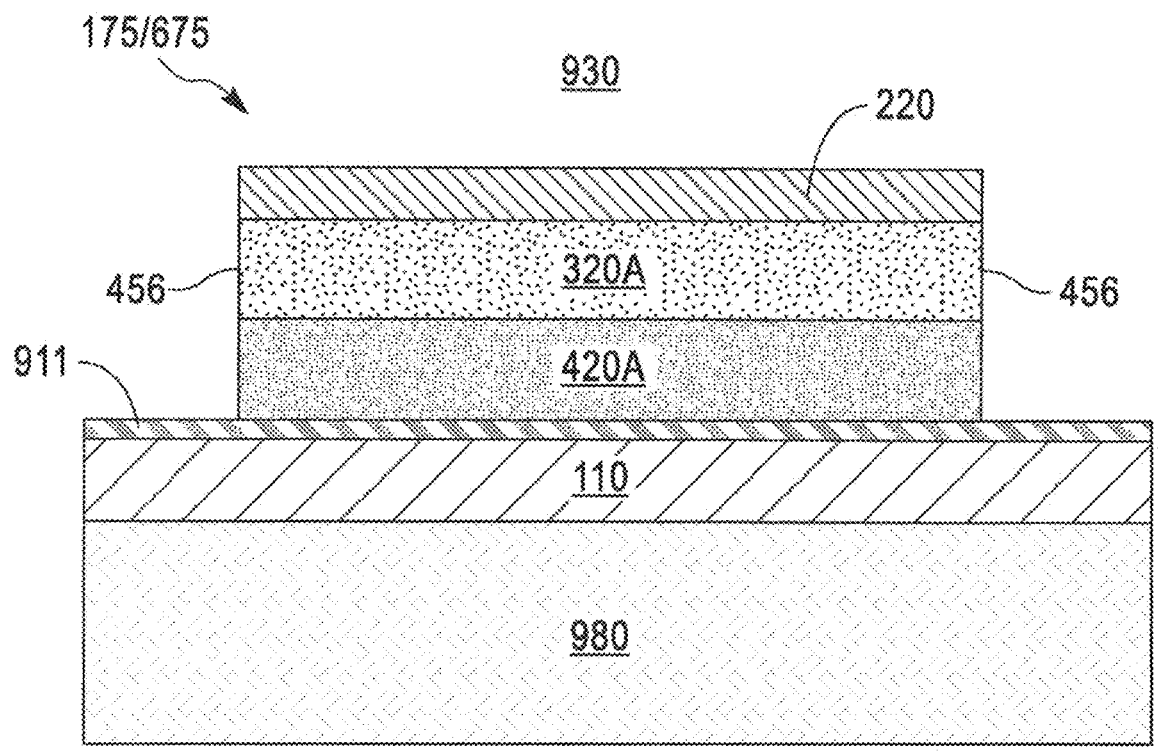
FIG. 9C shows one of the final anode structures which has been flipped on the current collector 110 where the release tape 850 has been removed.

FIG. 9B shows an embodiment 920 of the final anode structure 675, e.g., 220/320A/420A, which has been flipped on the current collector 110 with the tape 850.

In this embodiment 920, plated metal layer 980 is plated, i.e., electrochemically plated, on the current collector 110 to increase the thickness of the current collector for better handling of the anode structure. Known plating techniques, e.g., electrochemical baths are used to plate the plated metal layer 980. The plated metal layer 980 can be made of a metallic material, e.g., copper (Cu), Nickel (Ni), etc. The plating occurs only on the current collector side because the tape 850 prevents plating on layer 220.

In some embodiments an adhesion promoting layer 912, e.g., of Cu, or Ti/Cu or Ni, or Ti/Ni is deposited on the exposed structure (back surface) current collect 110 to promote formation of the metal layer 980. The thickness of this metal layer can be in the range of 1-50 microns thick.

The metal layer is either physically deposited by vacuum evaporation or by sputtering, or deposited by electroless, or by electroplating electroless or electroplated.

The plating layer 980 adds thickness and strength to the current conductor 110 to provide better handling later in the process.

In alternative embodiments, the adhesion promoting layer 912 is applied directly on layer III, 420A/630S before the current collector 110 is added.

In these embodiments, the plated metal 980 lies directly on the layer III and replaces the function of the current collector 110 which optionally may or may not be used.

FIG. 9C shows the final anode structure 675 which has been flipped on the current collector 110 and where the release tape 850 has been removed.

Figure 9D:
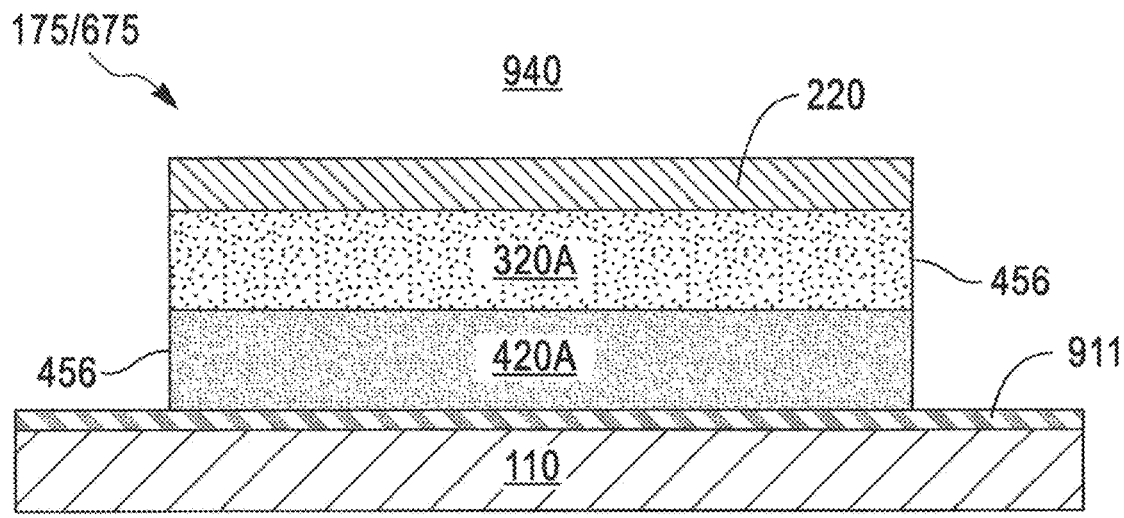
FIG. 9D shows an alternative embodiment of one of the final of an anode structures which has been flipped on the current collector, where the release tape 840 removed, without the addition of the plate layer.

FIG. 9D shows a final embodiment 940 of an anode structure 675 which has been flipped on the current collector 110 and where the release tape 840 has been removed.

A problem encountered in the thin anode lithium-ion battery of the present invention is the formation of cracks in the crystalline porous-Si anode structure which can occur during the layer release process. The cracks formed create spaces where Li can intercalate during charge/discharge cycles which degrades the battery performance.

Figure 10:
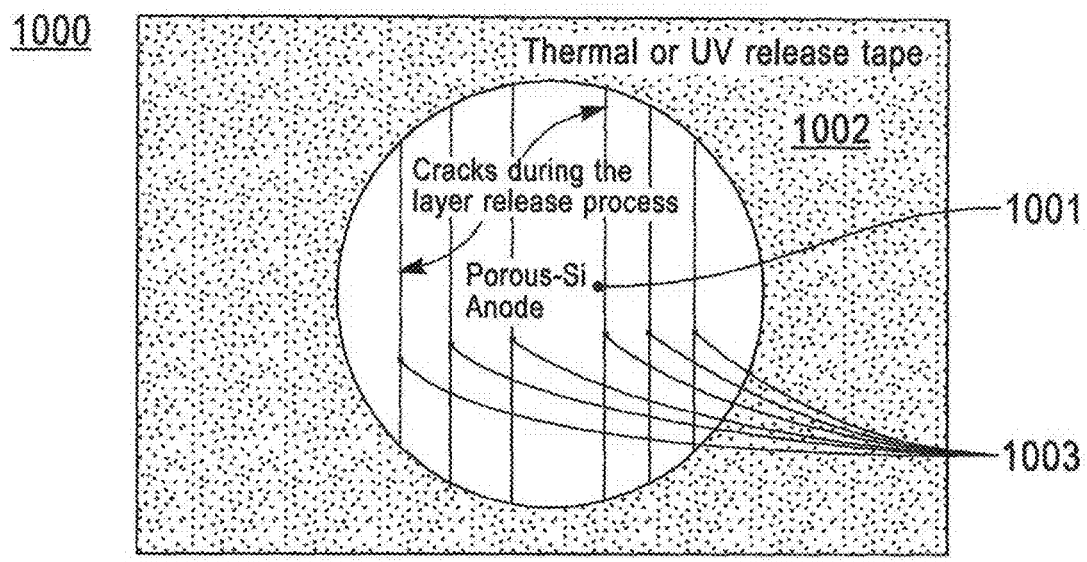
FIG. 10 is a top view of the cracks in the crystalline porous-Si anode structure after its release using a tape.

An example of the crack formation mentioned is depicted in FIG. 10, 1000, which depicts a top view of a porous-Si anode 1001 covered with a thermal or UV release tape 1002 showing the plurality of cracks 1003 formed during the layer release process. Embodiments disclosed below describe some solutions to the cracking of the crystalline porous-Si anode structure.

The thermal release tape used in accordance with the present invention is made from polyester film and a thermal-release adhesive having single-coated or double-coated layers, and is a unique adhesive tape that adheres tightly at room temperature and is easily be picked up from the substrate simply by heating. The UV adhesive tape operates in a similar manner such that after UV light is applied, curing on the tape, the adhesion level drops, and the tape is released from the substrate.

Free-Standing Crystalline Porous-Si Anode Structure.

Figure 11:
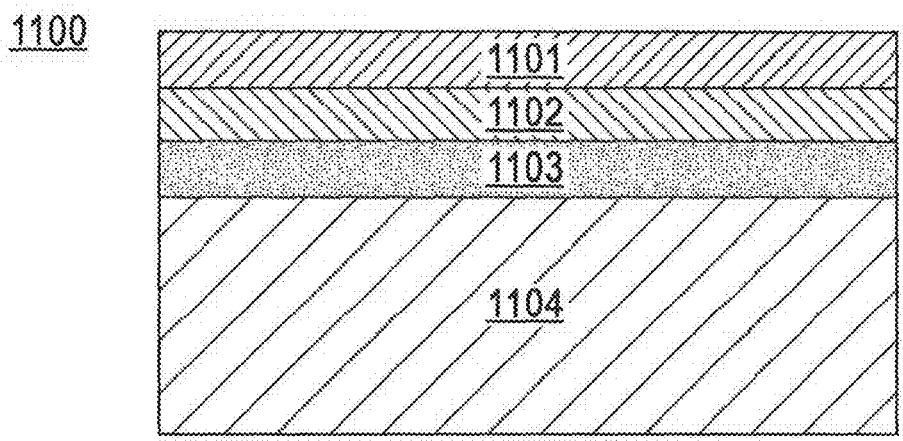
FIG. 11 is a block diagram of the anode porous-Si structure (Region I and Region II) on porous-Si Region III which facilitates the release of the anode structure along with the majority of Region III.
Figure 12:
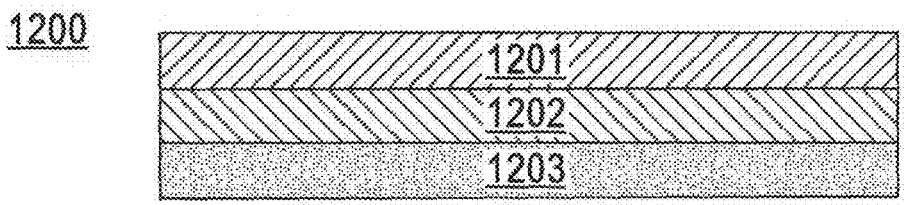
FIG. 12. is a block diagram of the free-standing crystalline porous-Si anode structure.

One preferred solution to minimize or eliminate the crack formation is to modify the anodic etching process such that a free-standing film of Si with the anode structure depicted in FIG. 11 (1100) is detached from the p+ doped Si substrate depicted in FIG. 12 (1200). Free standing Si film can also be formed in n-Si and has been described in the prior art. However, in this invention modifications are implemented in the porous Si structure in p+ doped Si substrate to obtain a free-standing Si layer. This is accomplished by applying a high current density and adding ethanol and water in HF during the second step of porosifying the silicon which forms a higher porosity silicon layer underneath the first porous-Si layer that is formed with HF (48-50%) solution only.

For purposes of this invention disclosure, the designation "p⁻ Si" refers to Si doping levels below $10^{17}$ cm$^{-3}$. Doping levels of $10^{18}$ cm$^{-3}$ and above are referred to hereinafter as "p+ Si."

The plus sign (+) refers to "extrinsic" doping such that the material is highly conductive. A p+ Si type wafer is usually doped with Boron, although Gallium can also be used. The p+ wafers are heavily doped and typically have resistances of <0.1 Ohm-cm.

As noted above, the "regions," interchangeably termed "layers" comprising the elements forming the anodes treated in the cracking prevention methods defined in the present invention generally include a lithium nucleation layer comprising:
a first semiconductor layer made of a porous, single crystalline, semiconductor material selected from silicon, germanium, silicon-germanium, and III-V compounds, and having a first porosity with an average pore diameter below 5 nm and having a first layer thickness between 50 nanometers (nm) to 50 micrometers (μm) and disposed on the current collector, and
a second semiconductive layer made of a porous, single crystalline, semiconductor material selected from silicon, germanium, silicon-germanium, and III-V compounds, and having a second porosity of between about 30% and 50%, said second semiconductive layer being disposed directly underneath said first semiconductive layer; and
a third semiconductive layer made of a porous, single crystalline, semiconductor material selected from silicon, germanium, silicon-germanium, and III-V compounds, and having a third porosity of between about 30% and 60%, said third semiconductive layer being disposed directly underneath said second semiconductive layer.

"Porosity" as used herein is defined as the volume of parallel pores in the particle compared with the total volume of the particle. Ideally one should use silicon microparticles containing nano-sized pores.

Unlike the prior art, the present invention does not incorporate Li inside the pores present in a Si wafer. This is because the presence of Li in the pores in a Si wafer adversely affects the volume of said wafer. The small pores of the Si wafer of the present invention prevent Li from going into the Si wafer. In accordance with the present invention, pore size is controlled so that the electroplated or electrolessly plated metal is formed on top of, rather than within the small pores present in the Si wafer.

The lithium nucleation layer is directly disposed on an anode current collector electrode comprising a conductive substrate made of a material that is non-reactive with lithium, and that is smooth to less than a value of 100 nanometer (nm) root mean squared (RMS).

FIG. 11 depicts the anode porous-Si structure Region I 1001 and Region II 1002 on porous-Si Region III 1103 on a Si substrate 1004 which facilitates the release of the anode structure along with the majority of Region III.

FIG. 12 shows the free-standing crystalline porous-Si anode structure including single crystalline porous Si anode Regions I 1201, II 1202, and single free-standing crystalline porous-Si anode structure including single crystalline porous Si anode Region III, 1203.

A non-limiting example of the aforementioned anodic etching process comprises initially obtaining a p+ Si substrate, and electrochemically etching the anode with 49% HF, 5 mA/cm² for between 5 and 20 minutes. The next step is to scribe the edge of the anode around the porous-Si region, followed by a subsequent anodic etching using 49% HF:Ethanol:H₂O (1:1:1), 20-30 mA/cm² in pulse or DC mode for from 10 to 500 seconds The anodic etch current is then increased to >50 mA/cm² to create free standing porous-Si with Regions I, II, and III (partially) as shown in FIG. 12.

Metal Coating Applied On the Back Surface of a Crystalline Porous-Si Anode Structure.

Figure 13A:
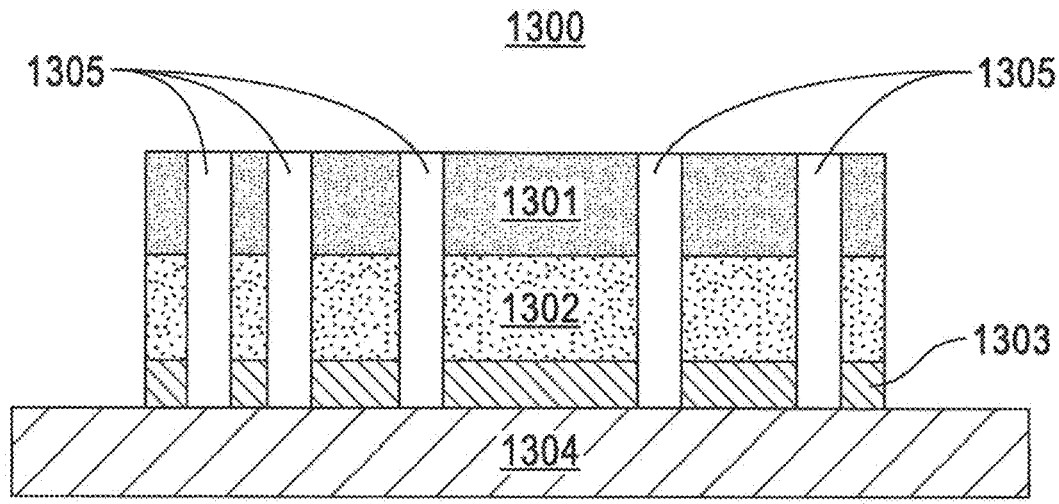
FIG. 13$a$ is a is a block diagram cross-sectional view of cracks in the released crystalline porous-Si anode structure on a thermal or UV released tape.

An alternative embodiment of the present invention is an inventive method designed to improve the crystalline porous-Si anode structure even in the presence of cracks (FIG. 13a).

FIG. 13A depicts a non-limiting example, having crystalline porous-Si anode structure consisting of Layer III 1301, atop Layer II 1302 atop a thin SC layer 1303 atop thermal or UV release tape 1304. FIG. 13A depicts a plurality of cracks 1305 that extend through Layers I, II and III ending with the release tape. The crystalline porous-Si anode structure of FIG. 13A is subjected to treatment wherein a conductive seed layer, such as Ti or Ni is deposited on the back surface of the released porous-Si structure, e.g., by sputtering or by the atomic layer deposition method such that the seed layer covers both the top surface of Layer III as well as filling the cracks that extend through the Layers III through I.

Figure 13B:
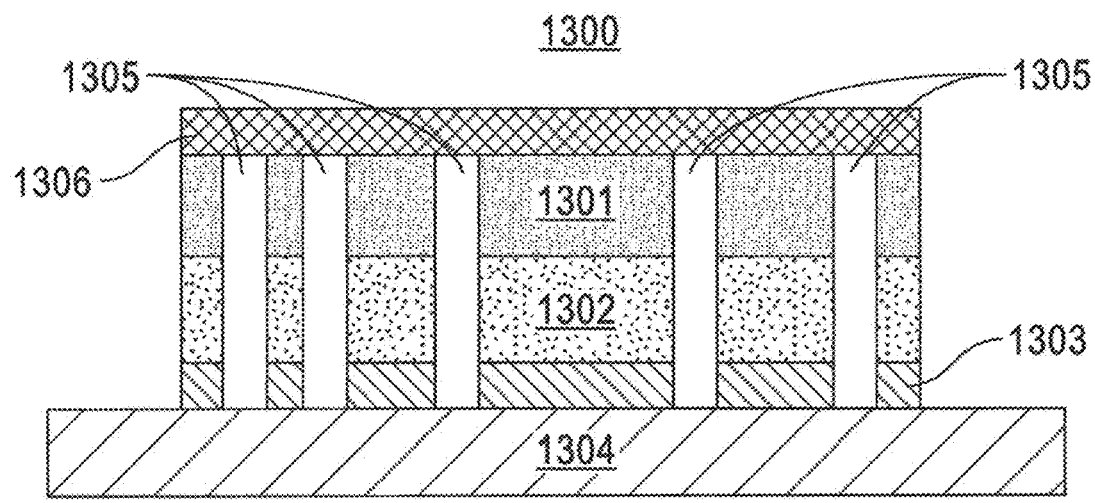

FIG. 13B is a cross sectional view of Ti or Ni metal filled cracks in the released crystalline porous-Si anode structure on a thermal or UV release tape. FIG. 13B depicts a crystalline porous-Si anode structure consisting of Layer III 1301, atop Layer II 1302 atop a thin SC layer 1303 atop thermal or UV release tape 1304. FIG. 13B shows deposited Ti or Ni metal seed layer 1306 covering the exposed surface of Layer III 1301 as well as filling the cracks 1305 that extend through Layers III to I.

Figure 13C:
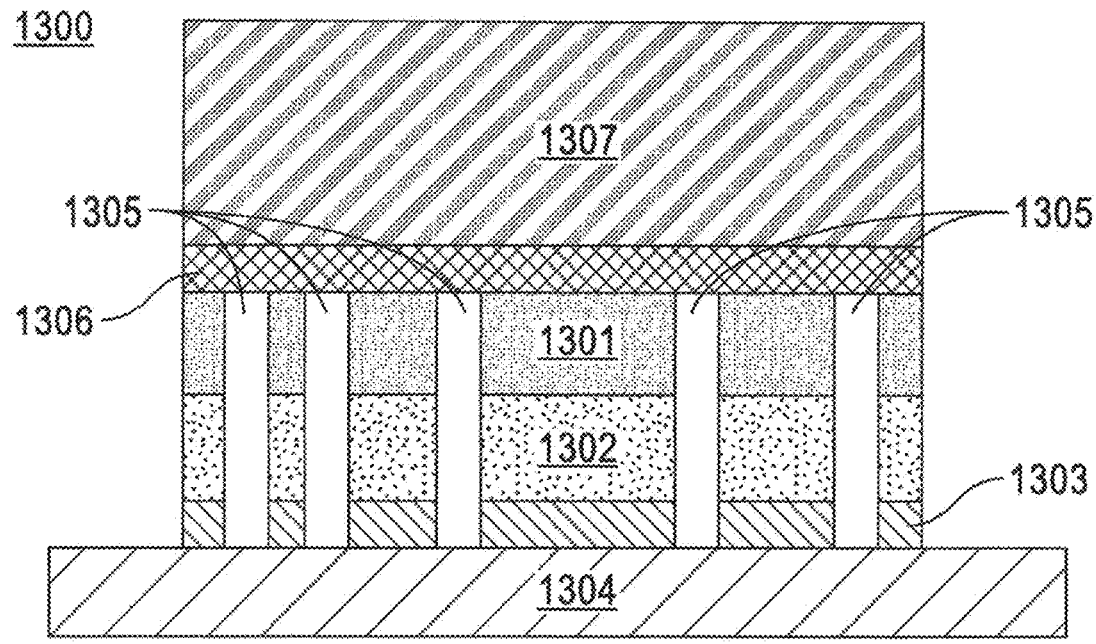

FIG. 13C depicts a non-limiting example, having crystalline porous-Si anode structure consisting of a current collector metal 1307 atop metal seed layer 1306 atop Layer III 1301, atop Layer II 1302 atop a thin SC layer 1303 atop thermal or UV release tape 1304. Current collector metal 1307 is an electrically conducting metal that does not react with lithium, e.g., Ni or Cu which is electroless or electroplated on metal seed layer 1306 to a thickness of >5 μm so that the anode structure can be handled easily without further cracking for subsequent processing and/or making the lithium-ion battery. FIG. 13C is a cross sectional view of metal-filled cracks in the released crystalline porous Si-anode structure on a thermal or UV tape after electroplating of a non-Li reacting metal.

Mechanically or Chemically Thinning of Crystalline Porous-Si Anode Structure.

Figure 14:
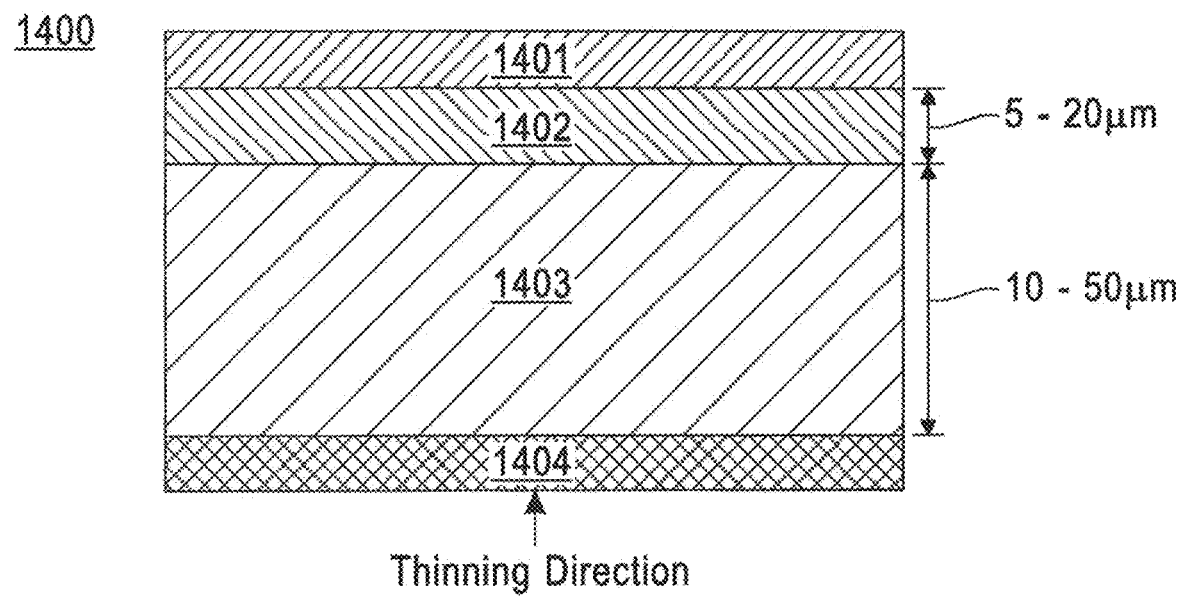
FIG. 14 is a block diagram of a cross-sectional view of the mechanically thinned crystalline porous-Si anode structure with a deposited metal or a metal tape as the current collector.

In another embodiment, a thin layer of p+ Si substrate maintains a uniform electrical contact with the porous structure at the surface as shown in FIG. 14.

The structure of FIG. 14 comprises a Single Crystalline Porous-Si Layer I, 1401, having a thickness of between about 2 nm and 200 nm, atop a thin Single Crystalline Porous-Si Layer II, 1402, having a thickness of 1 mm and 50 mm atop Si substrate 1403. Once the three layers are set, a non-Li reacting metal layer 1404, such as Cu or Ni is subsequently deposited on the back surface of the Si substrate 1403 by vacuum evaporation or sputtering; or by performing electroless or electroplating of Cu or Ni thereon in the thickness range of 1-100 microns.

Once the three layers are set, a non-Li reacting metal layer (or tape) 1404, such as Cu or Ni is subsequently deposited on the back surface of the Si substrate 1403 by vacuum evaporation or sputtering; or by performing electroless or electroplating of Cu or Ni thereon.

Structure 1400 is obtained by forming Single Crystalline Porous-Si Layer I, 1401 atop Single Crystalline Porous-Si Layer I, 1402. Thin Single Crystalline Porous-Si Layers I and II are then secured to an upper surface of a commercial p+ Si substrate having a thickness ranging between about 200 μm and 800 μm.

Then using standard mechanical grinding of Si substrate 1403 is thinned to a range of between about 10 μm and 100 μm followed by the standard chemical/mechanical polishing method.

Alternatively, the commercial p+ Si substrate are chemically thinned in a HF/HNO$_3$ solution with the HF/HNO$_3$ ratio of 1:3 to 1:10. Note that only two porous layers, namely Layer I, 1401 and Layer 2, 1402 are required for the Si anode in this approach. Since the surface porous-Si is not being released here, there is no need to form a layer.

In yet another alternative, porous layers 1401 and 1402 are made on an already thinned Si (without requiring further mechanical thinning). A metal layer of Cu or Ni is subsequently deposited on the back surface of the Si substrate 1403 by vacuum evaporation or sputtering; or by performing electroless or electroplating of Cu or Ni thereon. Note that the metal layer deposited by any of the aforementioned methods may have unintentional compressive or tensile stress although these should be nominally stress-free.

The deposited or electroless or electroplated Ni or Cu on the back surface of the FIG. 14 structure serves to act as the current collector. It is important that an adhesion layer of Ti, Cr, or Al be first deposited prior to Cu or Ni deposition to form a strong bond with 1403. The thin layer of a metal selected from Ti and Cr, or a bilayer of Ti/Cu or Cr/Cu is directly interposed between said electroless or electroplated non-Li reacting metal layer.

Thin Crystalline Porous-Si Anode Structure on P-Doped Silicon Epitaxy Grown on Porous-Si with a Porous-Si Release Layer

A further embodiment comprises a structure having a thin crystalline porous-Si anode structure on p-doped Silicon epitaxially grown p+ Si on porous-Si with a porous-Si release layer The use of a release layer has an attractive feature as it allows reuse of a semiconductor substrate after releasing the surface portion of the substrate, thus reducing cost of Si anode.

Various release layer techniques in addition to the growth of an epitaxial layer of crystalline Si on a dual porous suitable for use in accordance with the present invention include a dual porous structure and its release.

Epitaxial growth is broadly defined as the crystalline growth of silicon using gas precursors on a crystalline substrate. Epitaxial silicon is routinely grown using reduced pressure chemical vapor deposition (RPCVD), a modification of vapor phase epitaxy (VPE). Molecular-beam and liquid-phase epitaxy (MBE and LPE) also can be used, mainly for compound semiconductors. Solid-phase epitaxy is often used primarily for crystal-damage healing.

Epitaxial grown Si results in a high-quality crystal growth product that is different in kind from bulk Si wafers. This method is different from other thin-film deposition methods which deposit polycrystalline or amorphous films, even on single-crystal substrates.

In epitaxial films grown from gaseous or liquid precursors, because the substrate acts as a seed crystal, the deposited film takes on a lattice structure and orientation identical to those of the substrate.

Table 1 distinguishes Epitaxially Grown Si from Bulk Si wafer in accordance with the present invention.

TABLE 1

| | Bulk Si | Epitaxially Grown Si |
|---|---|---|
| Growth Temperature | 1415° C. (melting point) | 400-1200° C. well below MP |
| Charge Material | Polycrystal Chunks | Liquid or gaseous Si precursors, e.g., silane and its higher orders (disilane, trisilane, tetrasilane.) |
| Form factor | Round (up to 450 mm) or square (156 mm x 156 mm) | Any arbitrary form |
| Typical thickness range | 150 μm-1.5 mm | Angstroms - microns typically < 10 μm |
| Unintended impurities and distribution | C, O, B, Cu, Fe, etc. throughout the thickness | None, highly pure silicon |
| Doping | Added in the melt or via gases in the crystal puller | Dopant gases (diborane, phosphine, etc.) added in the silane gas mixture that is fed into the epitaxial gas chamber |

Table 1 establishes that an anode assembled in accordance with the present invention that is formed with epitaxially grown Si, has a structure, molecularly and otherwise, that is different in kind from anodes formed from a bulk type Si.

Figure 15:
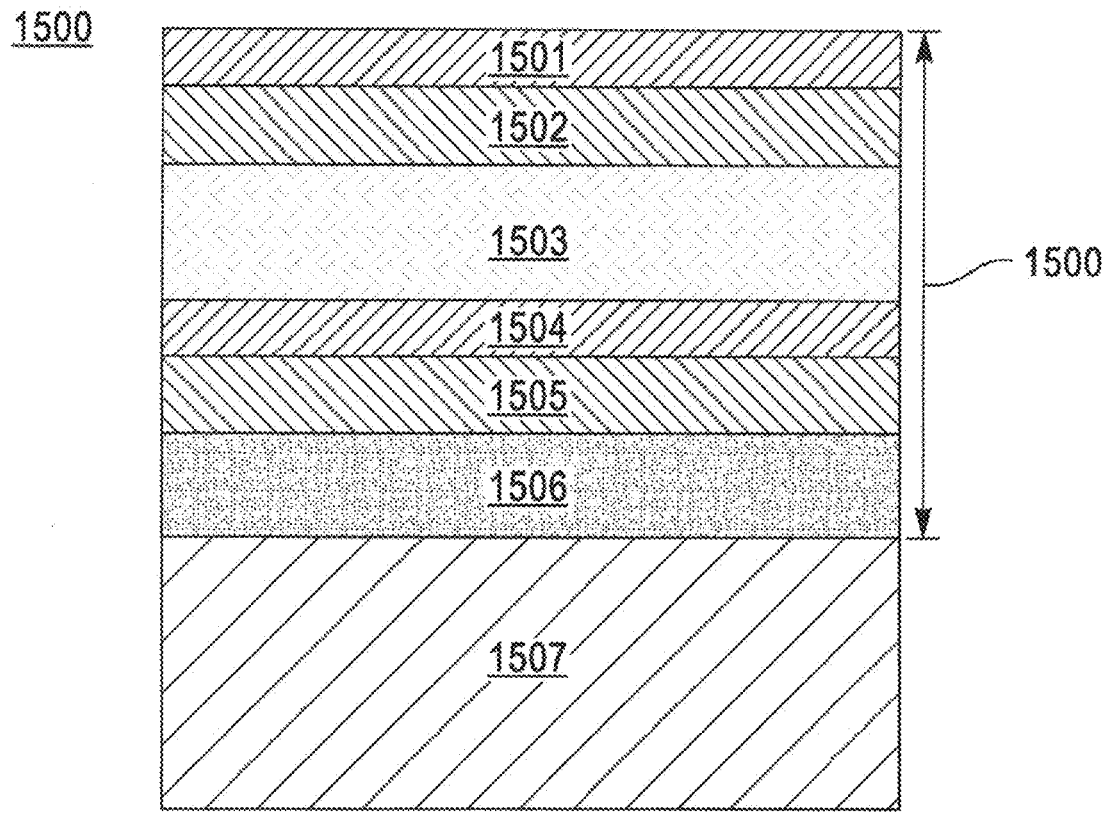
FIG. 15 is a block diagram of a cross-sectional view of the releasable crystalline porous-Si anode structure with electrically connected crystalline p-doped Si underneath it.

The structure depicted in FIG. 15 consists of porous Si—Region I, 1501, atop porous Si—Region II, 1502, atop a layer of an epitaxially grown p+ Si, 1503 Layer III, positioned atop a porous Si—Region I' 1504, atop porous Si—Region II" 1505 atop porous Si—Region III'" 1506 all on a base of a p$^+$ Si substrate 1507.

In this embodiment, the precursor of the crystalline porous-Si structure of FIG. 11 is first created. The following process steps are undertaken to form a releasable crystalline porous-Si anode structure that is electrically connected to the epitaxial p$^+$ Si uniformly having the elements shown in FIG. 15.

The process to form said structure comprises cleaning the p+ Si substrate using any suitable method; then, performing a first electrochemical etch to form layers I and II as described in the FIG. 11 embodiment. The electrochemical solution is changed and performing another electrochemical etch is performed to form layer III as described in the FIG. 11 embodiment.

A high temperature (>1100° C.) bake of the structure is then performed in H$_2$ to close the pores in the surface region I to create a pore-free single crystal seed at the surface. Following that step, implementing the epitaxial growth of single crystal p+ Si on the surface of the Si to a thickness ranging from 5-50 um. A second anodic etching in 49% HF, 5-10 mA/cm$^2$ for 5 minutes or greater to obtain porous-Si regions I and II in the epitaxially grown Si, as shown in FIG. 17.

The benefit of using epitaxially grown silicon in this embodiment, in addition to those already discussed above, and as compared with the prior art is: (i) the thickness and p-doping of the porous-Si anode structure is controlled by Si epitaxy, (ii) the pre-bake and step (i) are performed in a single epitaxial growth run, (iii) it does not require any mechanical or chemical thinning, (iv) the Si substrate can be reused allowing a low-cost manufacturing of the porous-Si anode.

Figure 16:
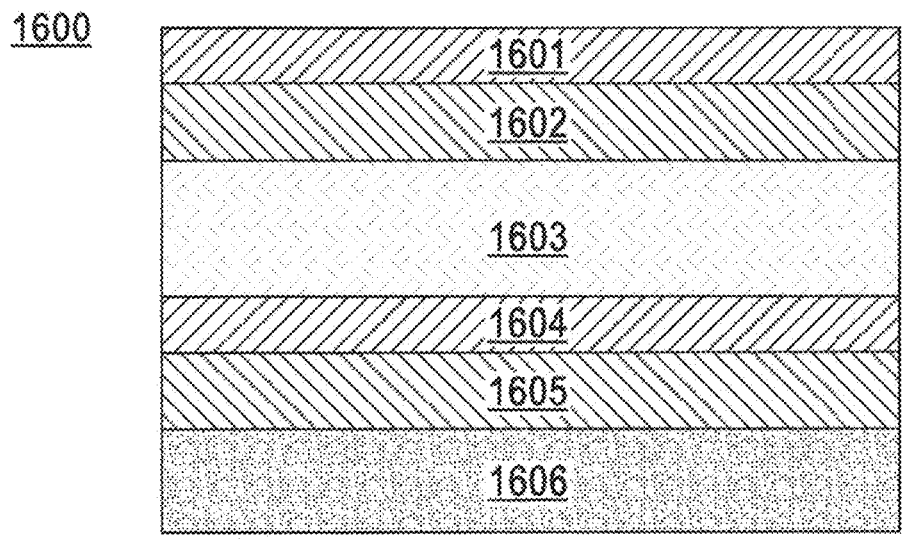
FIG. 16 is a block diagram of a cross-sectional view of the free-standing crystalline porous-Si anode structure with electrically connected crystalline p-doped Si underneath it.

Referring to FIG. 16, the porous Si structures Region I 1601 (1501) atop Region II 1602 (1502) atop the epitaxially grown p+ Si layer III 1603 (1503) as depicted in FIGS. 15 and 16 are then released with or without the assistance of a tape to form a free-standing structure.

Figure 17:
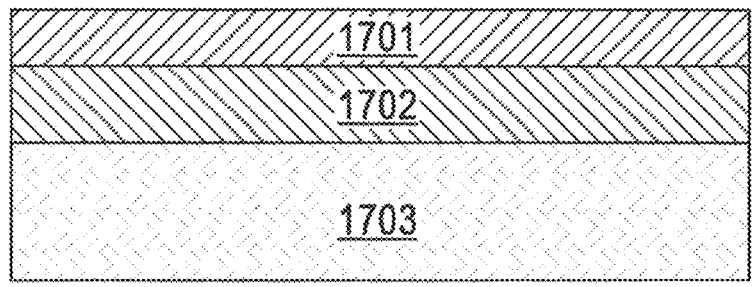
FIG. 17 is a block diagram of a cross-sectional view of the free-standing crystalline porous-Si anode structure with electrically connected crystalline p-doped Si underneath it after removing porous-Si regions I", II", and III" of FIG. 16.

The porous-Si regions I', 1604 (1504), II'' 1605 (1505), and III''' 1606 (1506) below the epitaxially grown Si depicted in FIGS. 15 and 16 are then etched away chemically, mechanically or by reactive ion etching to obtain the structure comprising porous Si Region I 1701, porous Si Region II and epitaxially grown p+ Si region 1703 as shown in FIG. 17.

Figure 18:
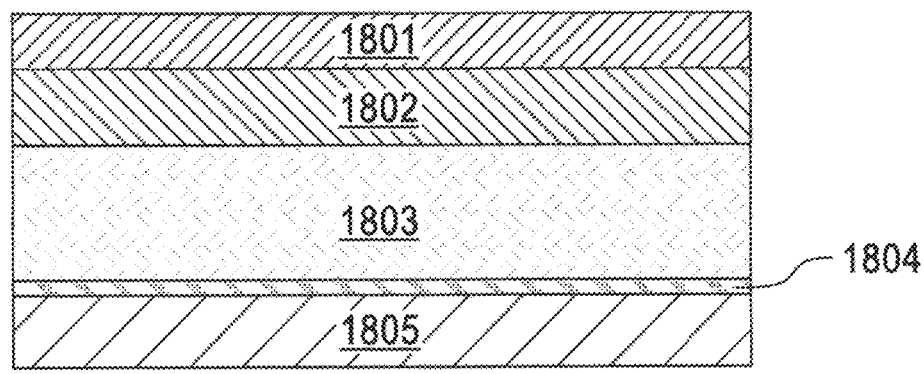
FIG. 18 is a block diagram of a cross-sectional view of the crystalline porous-Si anode structure with a deposited metal or a metal tape as the current collector.

FIG. 18 is a cross-sectional view of the free-standing crystalline porous-Si anode structure having elements porous Si—Region 1 1801, porous Si—Region II 1802 atop an electrically connected crystalline p-doped Si 1703 layer that has been epitaxially grown.

The free-standing crystalline porous-Si anode structure of FIG. 18 has been treated with a deposited metal wherein a non-Li reacting electroless or electroplated metal has been deposited as the current collector 1805.

More particularly, following the etching step noted above that removes the porous-Si regions I', II'', and III''', depicted in FIGS. 15 and 16, an insulating tape 1804 is inserted between epitaxially grown p+ Si layer 1803 and current collector 1805, as shown in FIG. 18 to form the target crystalline porous-Si anode structure.

Figure 19:
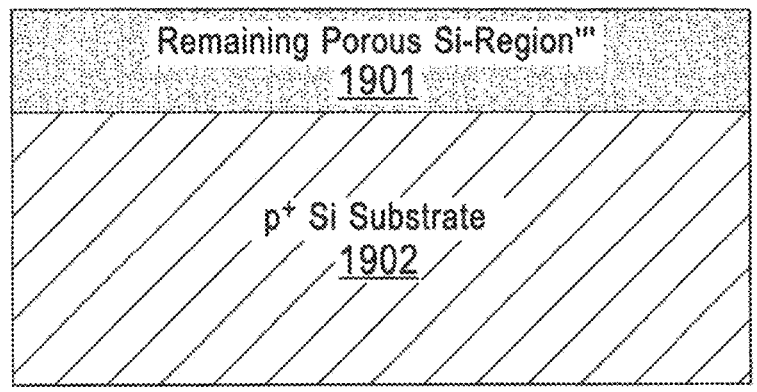
FIG. 19 is a cross-sectional view of the remaining substrate Si after the release of the structure of FIG. 18.

FIG. 19 depicts the epitaxially grown p+ Si substrate and layer III that are removed from the bottom surface of porous Si Region II 1702 permitting the epitaxially grown p+ Si substrate to be reused and to undergo the aforementioned steps for fabricating the next porous-Si anode structure.

Figure 20:
FIG. 20 is a cross-sectional view of the remaining substrate Si after removal of the remaining portion of region III in FIG. 19.

FIG. 20 is a cross-sectional view of the remaining substrate Si 2001 after removal of the remaining portion of region III in FIG. 19.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments.

The terminology used herein was chosen to best explain the principles of the embodiments, the practical application or technical improvement over technologies found in the marketplace, or to enable others of ordinary skill in the art to understand the embodiments disclosed herein.

The terminology used herein was chosen to explain the principles of the embodiments and the practical application or technical improvement over technologies found in the marketplace or to otherwise enable others of ordinary skill in the art to understand the embodiments disclosed herein. Devices, components, elements, features, apparatus, systems, structures, techniques, and methods described with different terminology that perform substantially the same function, work in the substantial the same way, have substantially the same use, and/or perform the similar steps are contemplated as embodiments of this invention.

What I claim and desire to protect by Letters Patent is:

1. A thinned crystalline porous anode structure suitable for use in a lithium-ion battery, said battery containing a cathode layer and an electrolyte/separator layer disposed in sequence between said cathode layer and said anode structure, said anode structure comprising:

a non-patterned unitary construction having a single crystalline porous semi-conductive silicon surface region comprising:

a first top porous layer having a first thickness of between about 1 µm and 20 µm; and a second porous layer located beneath said top porous layer having a porosity between 30% and 50% and forming an interface with said top porous layer with a second thickness of between 1 µm and 50 µm;

said second porous layer being atop and in direct contact forming an interface with a p+ silicon substrate, said p+ silicon substrate having a thickness greater than 200 µm; and wherein said p+ Si substrate has a resistivity range between 0.05 and 0.005-ohm cm, and surface crystallographic orientations comprising (100), (110), (111), (211), and (311) and, wherein said p+ silicon substrate is supported by a metal current collector having a thickness of between 1 µm and 50 µm.

2. The thinned crystalline porous anode structure suitable for use in a lithium-ion battery defined in claim 1 wherein a third porous layer is disposed underneath and in contact with an underside of said second porous layer, said third porous layer having a porosity between 30% and 60% and having a thickness in the range of 10 µm to 50 µm.

3. The thinned crystalline porous anode structure suitable for use in a lithium-ion battery defined in claim 2 wherein said p+ Si substrate is doped with a p-dopant in sufficient concentration to obtain p-type conductivity.

4. The thinned crystalline porous anode structure suitable for use in a lithium-ion battery defined in claim 3 wherein said p-dopant that is present in sufficient concentration to obtain p-type conductivity is Boron.

5. The thinned crystalline porous anode structure suitable for use in a lithium-ion battery defined in claim 2 wherein said third porous layer is composed of doped layer made of silicon-germanium (SiGe) with a less than 30% concentration of germanium.

6. The thinned crystalline porous anode structure suitable for use in a lithium-ion battery defined in claim 5 wherein said p+ Si substrate is composed of doped layer made of silicon-germanium (SiGe) with 15% to 30% concentration of germanium.

7. The thinned crystalline porous anode structure suitable for use in a lithium-ion battery defined in claim 6 wherein said p+ Si substrate is composed of doped layer made of silicon-germanium (SiGe) with about 10% concentration of germanium.

8. The thinned crystalline porous anode structure suitable for use in a lithium-ion battery defined in claim 2 wherein said p+ silicon substrate is supported by a metal current collector having a thickness of between 10 µm and 50 µm incurred as a result of mechanical grinding of an original substrate.

9. The porous crystalline anode structure suitable for use in a lithium-ion battery, defined in claim 8 wherein said p+ silicon substrate supported by said metal current collector possesses a thickness of between 10 µm and 50 µm as a result of chemical thinning in a solution containing a HF/HNO$_3$ solution with the HF/HNO3 ratio of 1:3 to 1:10.

10. The porous crystalline anode structure suitable for use in a lithium-ion battery, defined in claim 9 wherein said p+ silicon substrate supported by said metal current collector possesses a thickness of between 10 µm and 50 µm as a result of chemical thinning in a solution containing a HF/HNO$_3$ solution with the HF/HNO$_3$ ratio of 1:3 to 1:10, said chemical thinning solution containing acetic acid surfactant.

11. The thinned crystalline porous anode structure suitable for use in a lithium-ion battery defined in claim 1 wherein said p+ Si substrate is doped with a p-dopant in sufficient concentration to obtain p-type conductivity.

12. The thinned crystalline porous anode structure suitable for use in a lithium-ion battery defined in claim 11 wherein said p-dopant that is present in sufficient concentration to obtain p-type conductivity is Boron.

13. The thinned crystalline porous anode structure suitable for use in a lithium-ion battery defined in claim 1 wherein said third porous layer is composed of doped layer made of silicon-germanium (SiGe) with a less than 30% concentration of germanium.

14. The thinned crystalline porous anode structure suitable for use in a lithium-ion battery defined in claim 13 wherein said p+ Si substrate is composed of doped layer made of silicon-germanium (SiGe) with 15% to 30% concentration of germanium.

15. The thinned crystalline porous anode structure suitable for use in a lithium-ion battery defined in claim 14 wherein said p+ Si substrate is composed of doped layer made of silicon-germanium (SiGe) with 10% concentration of germanium.

16. The thinned crystalline porous anode structure suitable for use in a lithium-ion battery defined in claim 1 wherein said p+ silicon substrate is supported by a metal current collector having a thickness of between 10 µm and 50 µm incurred as a result of mechanical grinding of an original substrate.

17. The porous crystalline anode structure suitable for use in a lithium-ion battery, defined in claim 16 wherein said p+ silicon substrate is supported by said metal current collector and possesses said thickness of between 10 µm and 50 µm as a result of chemical thinning in a solution containing a HF/HNO$_3$ solution with the HF/HNO$_3$ ratio of 1:3 to 1:10.

18. The porous crystalline anode structure suitable for use in a lithium-ion battery, defined in claim 17 wherein said p+ silicon substrate supported by a metal current collector possesses a thickness of between 10 µm and 50 µm as a result of chemical thinning in a solution containing a HF/HNO$_3$ solution with the HF/HNO$_3$ ratio of 1:3 to 1:10, said chemical thinning solution containing acetic acid surfactant.

\* \* \* \* \*